(12) United States Patent
Shiokawa et al.

(10) Patent No.: US 10,574,845 B2
(45) Date of Patent: Feb. 25, 2020

(54) IMAGE FORMING APPARATUS FOR CORRECTING SHEET CONVEYANCE MISALIGNMENT

(71) Applicant: KONICA MINOLTA, INC., Chiyoda-ku, Tokyo (JP)

(72) Inventors: Yasuo Shiokawa, Tokyo (JP); Yoshiteru Kawakami, Tokyo (JP); Takahiro Okubo, Kanagawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/959,399

(22) Filed: Apr. 23, 2018

(65) Prior Publication Data

US 2018/0343349 A1 Nov. 29, 2018

(30) Foreign Application Priority Data

| May 24, 2017 | (JP) | 2017-102435 |
| May 24, 2017 | (JP) | 2017-102438 |
| May 24, 2017 | (JP) | 2017-102439 |
| Jun. 5, 2017 | (JP) | 2017-110550 |

(51) Int. Cl.
*H04N 1/00* (2006.01)
*G03G 15/20* (2006.01)
*G06F 3/12* (2006.01)

(52) U.S. Cl.
CPC ......... *H04N 1/0066* (2013.01); *G03G 15/206* (2013.01); *G03G 15/2053* (2013.01); *G06F 3/1237* (2013.01); *H04N 1/00602* (2013.01); *H04N 1/00748* (2013.01); *H04N 1/00824* (2013.01)

(58) Field of Classification Search
CPC ............ H04N 1/0066; H04N 1/00602; H04N 1/00748; H04N 1/00824; G03G 15/2053; G03G 15/206; G06F 3/1237
See application file for complete search history.

(56) References Cited

U.S. PATENT DOCUMENTS

| 2013/0108283 A1* | 5/2013 | Kawanago | G03G 15/0189 399/16 |
| 2014/0193186 A1* | 7/2014 | Furuyama | G03G 15/657 399/388 |
| 2018/0164730 A1* | 6/2018 | Karakama | B65H 1/04 |

FOREIGN PATENT DOCUMENTS

| JP | 2013-091563 A | 5/2013 |
| JP | 2014-133634 A | 7/2014 |

* cited by examiner

*Primary Examiner* — Iriana Cruz
(74) *Attorney, Agent, or Firm* — Buchanan Ingersoll & Rooney PC

(57) ABSTRACT

An image forming apparatus includes a transfer section that transfers an image onto a sheet, a sheet conveying member that is provided upstream of the transfer section in a sheet conveyance direction and conveys the sheet, and a hardware processor that controls displacement of the sheet conveying member in such a way that the sheet is displaced along the width direction of the sheet. The hardware processor performs first displacement control in which the sheet conveying member is displaced in a direction which is specified in advance with respect to the sheet and in which an edge of the sheet in the width direction is directed toward a target position and second displacement control in which the sheet conveying member is displaced in the direction opposite the direction of the first displacement.

9 Claims, 20 Drawing Sheets

1121

| TYPE OF SHEET \ TIMING | 1 | | | 2 | | | ... | n | | |
|---|---|---|---|---|---|---|---|---|---|---|
| | AIM POSITION | DIRECTION | SPEED | AIM POSITION | DIRECTION | SPEED | ... | AIM POSITION | DIRECTION | SPEED |
| TYPE OF SHEET A | 0.3 | + | $V_1$ | 0.4 | + | $V_1$ | ... | — | — | — |
| TYPE OF SHEET B | 0.4 | + | $V_2$ | 0.5 | + | $V_2$ | ... | 0.6 | + | $V_3$ |
| TYPE OF SHEET C | 0.5 | + | $V_1$ | 0.6 | + | $V_1$ | ... | 0.7 | + | $V_2$ |
| ⋮ | ⋮ | ⋮ | ⋮ | ⋮ | ⋮ | ⋮ | ... | ⋮ | ⋮ | ⋮ |

| TYPE OF SHEET \ TIMING | 1 | 2 | ... | n |
|---|---|---|---|---|
| TYPE OF SHEET A | 0.1 | 0 | ... | −0.1 |
| TYPE OF SHEET B | 0 | 0 | ... | 0.2 |
| TYPE OF SHEET C | 0 | −0.3 | ... | 0 |
| ⋮ | ⋮ | ⋮ | ... | ⋮ |

FIG. 19

IMAGE FORMING APPARATUS FOR CORRECTING SHEET CONVEYANCE MISALIGNMENT

CROSS REFERENCE TO RELATED APPLICATIONS

The entire disclosure of Japanese Patent Application No. 2017-102435 filed on May 24, 2017, No. 2017-102438 filed on May 24, 2017, No. 2017-102439 filed on May 24, 2017, and No. 2017-110550 filed on Jun. 5, 2017 are incorporated herein by reference in their entirety.

BACKGROUND

Technological Field

The present invention relates to an image forming apparatus.

Description of Related Art

In general, an image forming apparatus (such as a printer, a copier, and a facsimile machine) using an electrophotographic processing technique applies (exposes) laser light on the basis of image data to a charged photoconductor drum (image bearing member) to form an electrostatic latent image. In the image forming apparatus, a developing unit supplies toner to the photoconductor drum provided with the electrostatic latent image to visualize the electrostatic latent image to form a toner image. The image forming apparatus further primarily or secondarily transfers the toner image to a sheet and heats and pressurizes the sheet by a fixing nip of a fixing unit to fix the toner image on the sheet. Some image forming apparatus include registration rollers that are disposed upstream of a transfer section, which transfers an image onto a sheet, and correct a positional deviation of the sheet in the width direction thereof, as described, for example, in Japanese Patent Application Laid-Open No. 2014-133634 (hereinafter referred to as PTL 1) and Japanese Patent Application Laid-Open No. 2013-91563 (hereinafter referred to as PTL 2).

By the way, the image forming apparatus has a problem of occurrence of a phenomenon (sub scanning obliqueness) in that a conveyance direction of the sheet is passed obliquely in a sub scanning direction due to misalignment from the registration rollers to the fixing nip through the secondary transfer nip. In addition to the case of the misalignment, the sub scanning obliqueness is likely to occur when there is a difference between the diameters at opposite ends of the rollers in the sheet width direction (sub scanning direction) due to a durability issue or the like. A long sheet with a long size in the conveyance direction is easily affected, and the sub scanning obliqueness often occurs. The sub scanning obliqueness leads to a poor image due to deviation, distortion, or the like of the image transferred at the transfer section, and a technique for reducing the sub scanning obliqueness is demanded.

In contrast, PTL 1 and other references each describe a technology for registration displacement control in which a line sensor is disposed between the registration rollers and the transfer rollers, the line sensor senses the position of the width-direction end (side end) of a sheet while the transfer rollers convey the sheet, and the registration rollers are moved based on the result of the sensing.

In the technology described in PTL 1 and other references, however, the line sensor senses deviation of the side end of a sheet from the reference position, the amount of displacement of the registration rollers is determined from the result of the sensing, and the registration rollers are displaced based on the determined value. The side end of the sheet therefore deviates from the reference position in some cases when the displacement is stopped.

SUMMARY

An object of the present invention is to provide an image forming apparatus capable of more properly correct sub scanning obliqueness of a sheet to suppress positional deviation of an image.

In order to realize at least one of the above objects, an image forming apparatus reflecting one aspect of the present invention includes: a transferer that transfers an image onto a sheet; a sheet conveyer that is provided upstream of the transferer in a sheet conveyance direction and conveys the sheet; and a hardware processor that controls displacement of the sheet conveyer in such a way that the sheet is displaced along a width direction of the sheet, in which the hardware processor performs first displacement control in which the sheet conveyer is displaced in a direction which is specified in advance with respect to the sheet and in which an edge of the sheet in the width direction is directed toward a target position and second displacement control in which the sheet conveyer is displaced in a direction opposite the direction of the first displacement.

An image forming apparatus reflecting still another aspect of the present invention includes: a transferer that transfers an image onto a sheet; a sheet conveyer that is provided upstream of the transferer in a sheet conveyance direction and conveys the sheet; and a hardware processor that controls displacement of the sheet conveyer in such a way that the sheet is displaced along a width direction of the sheet, in which the hardware processor sets a point of time of start of the displacement in such a way that the sheet conveyer is allowed to be displaced toward both sides of the width direction, and displaces the sheet conveyer based on a result of sensing performed by a deviation sensing unit that senses a direction in which an edge of the sheet in the width direction deviates from a target position in such a way that the sheet conveyer is not moved in a direction in which the edge of the sheet moves away from the target position.

An image forming apparatus reflecting still another aspect of the present invention includes: a transferer that transfers an image onto a sheet; a sheet conveyer that is provided upstream of the transfer section in a sheet conveyance direction and conveys the sheet; and a hardware processor that controls displacement of the sheet conveyer in such a way that the sheet is displaced along a width direction of the sheet, in which the hardware processor starts displacing the sheet conveyer in a first direction, then causes a detecting unit that detects an edge of the sheet in the width direction, and stops the displacement in the first direction based on a result of the detection performed by the detecting unit in such a way that the edge of the sheet reaches a target position, and conveys the sheet in such a way that the edge of the sheet in a position of the detecting unit deviates in the direction opposite the first direction with respect to the target position.

An image forming apparatus reflecting still another aspect of the present invention includes: an image writer that writes an image; a displacer capable of displacing a conveyed sheet; and a hardware processor that shifts a position where the image writer writes the image in such a way that the displacer is always displaced in a same direction.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 18 illustrates an example of data stored in a displacement control table;

FIG. 19 illustrates an example of data stored in a writing control table;

DETAILED DESCRIPTION OF EMBODIMENTS

Hereinafter, one or more embodiments of the present invention will be described with reference to the drawings. However, the scope of the invention is not limited to the disclosed embodiments.

(Embodiment 1)

Figure 1:
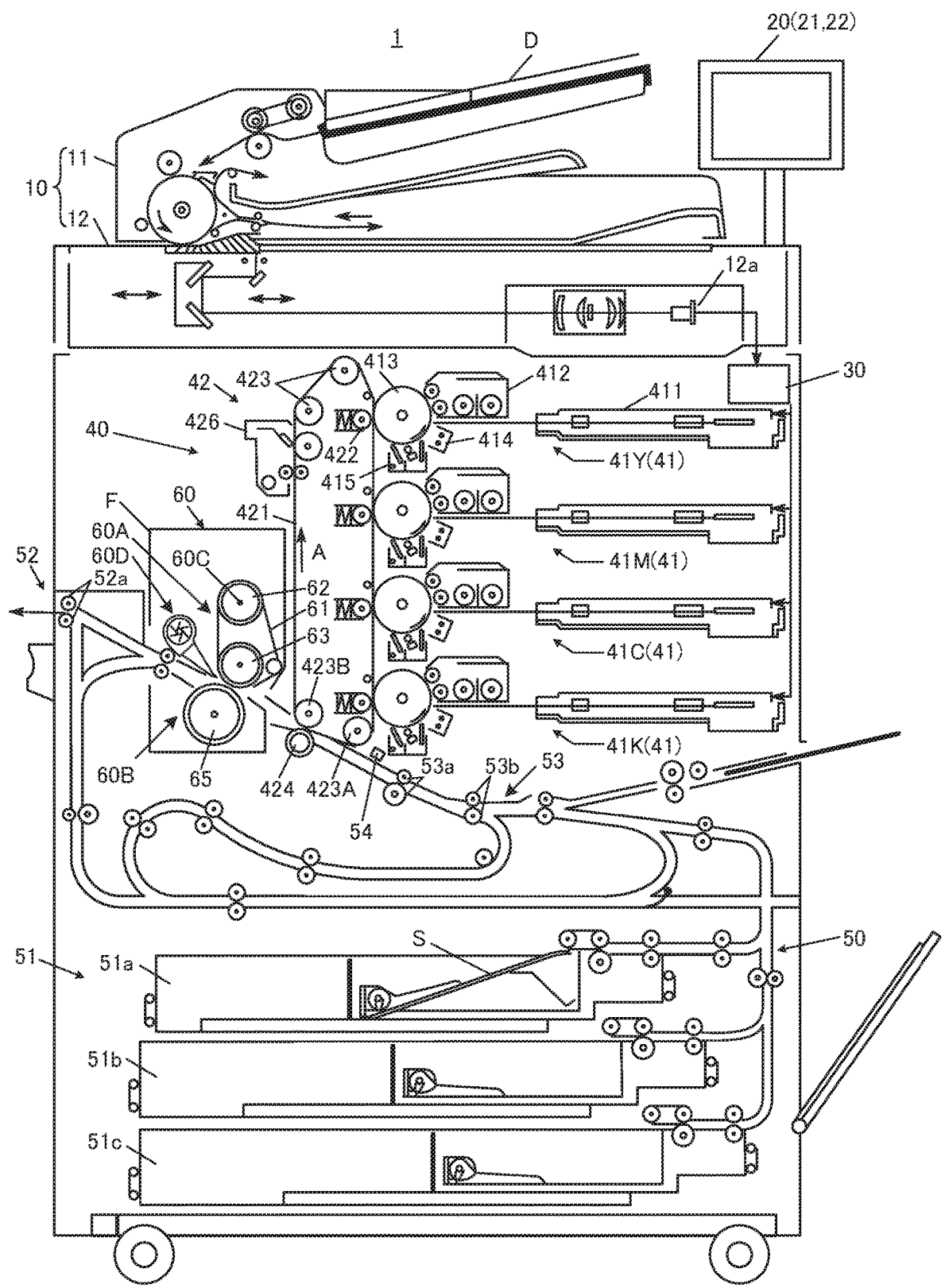
FIG. 1 schematically illustrates an overall configuration of an image forming apparatus according to the present Embodiment.
Figure 2:
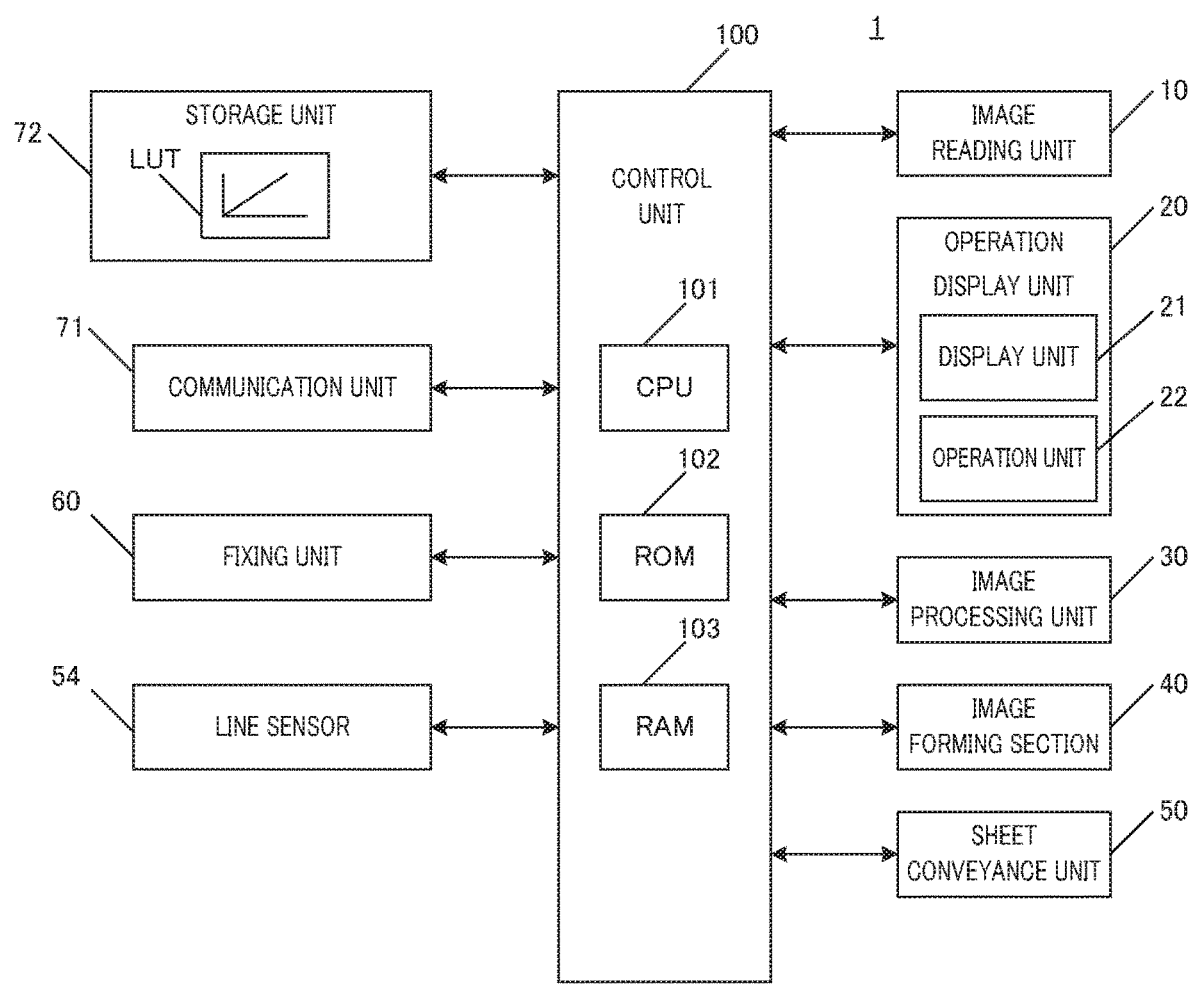
FIG. 2 is a block diagram showing main parts of a control system of the image forming apparatus of FIG. 1.

FIG. 1 schematically illustrates an overall configuration of image forming apparatus 1 according to the present Embodiment. FIG. 2 shows main parts of a control system of image forming apparatus 1 according to the present Embodiment.

Image forming apparatus 1 of the present Embodiment uses a long sheet or a non-long sheet as sheet S and forms an image on sheet S.

In the present embodiment, the long sheet is a piece of paper longer in a conveyance direction than regularly used sheets, such as A4-sized and A3-sized sheets. In the following description, a paper sheet simply referred to as a "sheet" can be either a long sheet or a non-long sheet.

Image forming apparatus 1 is a color image forming apparatus of an intermediate transfer system using an electrophotographic process technique. More specifically, image forming apparatus 1 primarily transfers toner images of colors Y (yellow), M (magenta), C (cyan), and K (black) formed on photoconductor drums 413 to intermediate transfer belt 421 and places the toner images of four colors on top of each other on intermediate transfer belt 421. Image forming apparatus 1 then secondarily transfers the toner images to the sheet to form a toner image.

A tandem system is adopted in image forming apparatus 1, in which photoconductor drums 413 corresponding to four colors of YMCK are disposed in series in a traveling direction of intermediate transfer belt 421, and the toner images of the colors are sequentially transferred to intermediate transfer belt 421 in one procedure.

As shown in FIG. 2, image forming apparatus 1 includes image reading unit 10, operation display unit 20, image processing unit 30, image forming section 40, sheet conveyance unit 50, fixing unit 60, control unit 100, and the like.

Control unit 100 includes CPU (Central Processing Unit) 101, ROM (Read Only Memory) 102, RAM (Random Access Memory) 103, and the like. CPU 101 reads a program according to details of processing from ROM 102 and loads the program in RAM 103. CPU 101 comprehensively controls the operation of blocks of image forming apparatus 1 in cooperation with the loaded program. In this case, CPU 101 references various types of data stored in storage unit 72. Storage unit 72 includes, for example, a non-volatile semiconductor memory (so-called flash memory) or a hard disk drive.

Control unit 100 transmits and receives various types of data to and from an external apparatus (for example, personal computer) connected to a communication network, such as LAN (Local Area Network) and WAN (Wide Area Network), through communication unit 71. For example, control unit 100 receives image data transmitted from the external apparatus and forms a toner image on the sheet based on the image data (input image data). Communication unit 71 includes, for example, a communication control card such as a LAN card.

Image reading unit 10 includes automatic original sheet feeding apparatus 11 called an ADF (Auto Document Feeder), original image scanning apparatus 12 (scanner), and the like.

Automatic original sheet feeding apparatus 11 conveys original D mounted on an original tray based on a conveyance mechanism and sends out original D to original image scanning apparatus 12. Automatic original sheet feeding apparatus 11 can continuously read, without pausing, images (including double-sided) of many pieces of original D mounted on the original tray.

Original image scanning apparatus 12 optically scans the original conveyed onto a contact glass from automatic original sheet feeding apparatus 11 or the original mounted on the contact glass and forms an image on a light-receiving surface of CCD (Charge Coupled Device) sensor 12*a* based on reflected light from the original to thereby read the original image. Image reading unit 10 generates input image data based on the reading result of original image scanning apparatus 12. Image processing unit 30 applies predetermined image processing to the input image data.

Operation display unit 20 includes, for example, a liquid crystal display (LCD) with a touch panel and functions as display unit 21 and operation unit 22. Display unit 21 displays various operation screens, states of images, operation conditions of functions, and the like according to display control signals input from control unit 100. Operation unit 22 includes various operation keys, such as numeric keys and a start key. Operation unit 22 receives various input operations by the user and outputs operation signals to control unit 100.

Image processing unit 30 includes a circuit or the like that applies digital image processing to the input image data according to initial setting or user setting. For example, image processing unit 30 performs tone correction based on tone correction data (tone correction table LUT) in storage unit 72 under the control of control unit 100. Other than the tone correction, image processing unit 30 also applies various correction processes, such as color correction and shading correction, compression processing, and the like to the input image data. Image forming section 40 is controlled based on the processed image data.

Image forming section 40 includes: image forming units 41Y, 41M, 41C, and 41K that form images using colored toners of Y component, M component, C component, and K component based on the input image data; intermediate transfer unit 42; and the like.

Image forming units 41Y, 41M, 41C, and 41K for Y component, M component, C component and K component have similar configurations. For the convenience of the illustration and the description, common constituent elements are indicated by the same reference signs, and Y, M, C and K are attached to the reference signs to distinguish the constituent elements. In FIG. 1, the reference signs are provided only to the constituent elements of image forming unit 41Y for Y component, and the reference signs are not illustrated for the constituent elements of the other image forming units 41M, 41C, and 41K.

Image forming unit 41 includes exposing device 411, developing device 412, photoconductor drum 413, charging device 414, drum cleaning apparatus 415, and the like.

Photoconductor drum 413 is, for example, a negative charge type organic photo-conductor (OPC) including an under coat layer (UCL), a charge generation layer (CGL), and a charge transport layer (CTL) sequentially laminated on a peripheral surface of an aluminum conductive cylindrical body (aluminum tube). The charge generation layer is made of an organic semiconductor in which a charge generation material (for example, phthalocyanine pigment) is dispersed on a resin binder (for example, polycarbonate), and the charge generation layer generates a pair of positive charge and negative charge based on exposure by exposing device 411. The charge transport layer is a layer in which a hole transport material (electron-donating nitrogen-containing compound) is dispersed on a resin binder (for example, polycarbonate resin), and the charge transport layer transports the positive charge generated by the charge generation layer to the surface of the charge transport layer.

Control unit 100 rotates photoconductor drum 413 at a constant circumferential speed (linear speed) by controlling a drive current supplied to a drive motor (not shown) that rotates photoconductor drum 413.

Charging device 414 uniformly applies a negative charge to the photoconductive surface of photoconductor drum 413. Exposing device 411 includes, for example, a semiconductor laser and applies laser light to photoconductor drum 413 according to the image of each color component. As a result, an electrostatic latent image of each color component is formed on the surface of photoconductor drum 413 due to the potential difference between the surface and the surroundings.

Developing device 412 is, for example, a two-component development type developing device, and developing device 412 attaches the toner of each color component to the surface of photoconductor drum 413 to visualize the electrostatic latent image to form the toner image.

Drum cleaning apparatus 415 includes a cleaning member or the like brought into sliding contact with the surface of photoconductor drum 413. A cleaning blade in drum cleaning apparatus 415 removes the remaining transfer toner left on the surface of photoconductor drum 413 after the primary transfer.

Intermediate transfer unit 42 includes intermediate transfer belt 421, primary transfer roller 422, a plurality of support rollers 423, secondary transfer roller 424, belt cleaning apparatus 426, and the like.

Intermediate transfer belt 421 includes an endless belt and is stretched by a plurality of support rollers 423 in a loop shape. At least one of support rollers 423 is a driving roller, and other support rollers 423 are driven rollers. For example, it is preferable that roller 423A disposed on the downstream of primary transfer roller 422 for K component in the belt traveling direction be a driving roller. As a result, the traveling speed of the belt in the primary transfer section can be easily maintained at a constant speed. Driving roller 423A rotates, and intermediate transfer belt 421 travels at a constant speed in an arrow A direction.

Primary transfer roller 422 faces photoconductor drum 413 of each color component and is disposed on an inner peripheral side of intermediate transfer belt 421. Primary transfer roller 422 is pressed against photoconductor drum 413 across intermediate transfer belt 421, and a primary transfer nip for transferring the toner image from photoconductor drum 413 to intermediate transfer belt 421 is formed.

Secondary transfer roller 424 faces backup roller 423B disposed on the downstream of driving roller 423A in the belt traveling direction, and secondary transfer roller 424 is disposed on an outer peripheral side of intermediate transfer belt 421. Secondary transfer roller 424 is pressed against backup roller 423B across intermediate transfer belt 421, and a secondary transfer nip for transferring the toner image from intermediate transfer belt 421 to sheet S is formed.

The secondary transfer nip formed by intermediate transfer belt 421, backup roller 423B, and secondary transfer roller 424 corresponds to a "transfer section" of the present invention.

When intermediate transfer belt 421 passes through the primary transfer nip, the toner images on photoconductor drums 413 are primarily transferred to intermediate transfer belt 421 and sequentially placed on top of each other. Specifically, a primary transfer bias is applied to primary transfer roller 422 to provide a charge with a polarity opposite the toner to the side of intermediate transfer belt 421 coming into contact with primary transfer roller 422, and the toner images are electrostatically transferred to intermediate transfer belt 421.

Subsequently, when the sheet passes through the secondary transfer nip, the toner images on intermediate transfer belt 421 are secondarily transferred to the sheet. Specifically, a secondary transfer bias is applied to secondary transfer roller 424 to provide a charge with a polarity opposite the toner to the side of the sheet coming into contact with secondary transfer roller 424, and the toner images are electrostatically transferred to the sheet The sheet provided with the toner images is conveyed toward fixing unit 60.

Belt cleaning apparatus 426 includes a belt cleaning blade or the like in sliding contact with the surface of intermediate transfer belt 421 and removes the remaining transfer toner left on the surface of intermediate transfer belt 421 after the secondary transfer.

Fixing unit 60 includes: upper fixing unit 60A including a fixing surface member disposed on the fixing surface side of the sheet; lower fixing unit 60B including a back surface support member disposed on the opposite side of the fixing surface of the sheet; heat source 60C; and the like. The back surface support member is pressed against the fixing surface member to form a fixing nip for sandwiching and conveying the sheet.

Upper fixing unit 60A includes endless fixing belt 61, which is the fixing surface member, heating roller 62, upper pressurizing roller 63, and other components (belt heating type). Fixing belt 61 is stretched by heating roller 62 and upper pressurizing roller 63 at predetermined belt tension (400 N, for example).

Lower fixing unit 60B includes lower pressurizing roller 65, which is, for example, the back surface support member (roller pressurizing type). Lower pressurizing roller 65 is pressurized against upper pressurizing roller 63 via fixing belt 61 at a predetermined fixing load. The fixing nip that sandwiches and conveys sheet S is thus formed between fixing belt 61 and lower pressurizing roller 65.

Fixing unit 60 fixes the toner image to the sheet by heating and pressurizing, in the fixing nip, the conveyed sheet on which the toner images have been secondarily transferred.

Fixing unit 60 is disposed as a unit in fixing device F. In fixing device F is further disposed air separation unit 60D, which blows air to separate sheet S from the fixing surface member.

Sheet conveyance unit 50 includes sheet feeding unit 51, sheet ejection unit 52, conveyance path unit 53, and the like. Three sheet feed tray units 51a to 51c of sheet feeding unit 51 hold sheets S (standard sheets, special sheets) according to preset types identified based on the basis weight (stiffness), the size, and the like. Conveyance path unit 53 includes a plurality of conveyance rollers, such as registration roller pair 53a and loop rollers 53b, a double-sided conveyance path for forming images on both sides of the sheet, and the like. Registration roller pair 53a corresponds to a "sheet conveyance member" of the present invention.

Registration roller pair 53a corrects the position of sheet S in the width direction under the control of control unit 100. Specifically, when sheet S is sandwiched between nips of registration roller pair 53a, control of registration displacement for moving registration roller pair 53a in the width direction to move sheet S is performed, and the position of sheet S in the width direction is corrected. Details of the control of the registration displacement will be described later.

Loop rollers 53b are a pair of rollers disposed upstream of registration roller pair 53a in the conveyance direction. Loop rollers 53b rotate under the control of control unit 100 in such a way that sheet S is looped in the space between registration roller pair 53a and loop rollers 53b to correct obliqueness of sheet S.

Registration roller pair 53a is separated after the correction of the position of sheet S in the width direction, before sheet S finishes passing through registration roller pair 53a, that is, in the middle of the conveyance of sheet S, and is returned to the position before the movement. Registration roller pair 53a is pressed and attached again after the rear-end of sheet S passes through registration roller pair 53a.

Under the control of control unit 100, the conveyance speed of sheet S at registration roller pair 53a is set faster than the conveyance speed of sheet S at the secondary transfer nip formed by backup roller 423B and secondary transfer roller 424.

Line sensor 54 is disposed on the downstream of registration roller pair 53a and the upstream of the secondary transfer nip in the sheet conveyance direction. Line sensor 54 is a sensor that is formed of linearly arranged photoelectric conversion elements and serves as a component that detects a one-side edge of sheet S in the width direction thereof (hereinafter referred to as side edge) to sense an offset of sheet S (deviation from reference position).

Sheets S housed in sheet feed tray units 51a to 51c are sent out piece by piece from the top and are conveyed by conveyance path unit 53 to image forming section 40. In this case, registration roller pair 53a corrects (skew corrects) the inclination of the fed sheet S and adjusts the conveyance timing.

In image forming section 40, the toner images of intermediate transfer belt 421 are secondarily transferred altogether to one of the surfaces of sheet S, and a fixing process is applied by fixing unit 60. Sheet ejection unit 52 including sheet ejection roller 52a ejects sheet S provided with the images to the outside of the apparatus. Note that during double-sided printing, sheet S after the image formation on a first surface passes through the double-sided conveyance path, and the front and the back are inverted. The toner images are secondarily transferred and fixed to a second surface, and sheet ejection unit 52 ejects sheet S to the outside of the apparatus.

By the way, the image forming apparatus has a problem of a phenomenon that the conveyance direction of the sheet is passed obliquely in the sub scanning direction (sub scanning obliqueness) due to misalignment from the registration roller pair 53a to the fixing nip through the secondary transfer nip. In addition to the misalignment, the sub scanning obliqueness is also likely to occur when there is a difference between the diameters at opposite ends of the rollers in the sheet width direction (sub scanning direction) due to a durability issue or the like. The long sheet with a long size in the conveyance direction is easily affected, and the sub scanning obliqueness often occurs (see FIG. 3A, FIG. 5A). The sub scanning obliqueness leads to a poor image due to deviation or distortion of the image transferred at the transfer section, and a technique of reducing the sub scanning obliqueness is demanded.

To address the problem described above in related art, registration displacement control is so performed that the position of the side edge of sheet S sensed with line sensor 54 is monitored, and registration roller pair 53a is displaced when positional deviation of the side edge occurs. Further, the main purpose of the registration displacement control in related art is control of the displacement of registration roller pair 53a before the front end of sheet S is thrust into the transfer section. The conventional registration displacement control will be described with reference to FIGS. 3A and 3B.

Figure 3A:
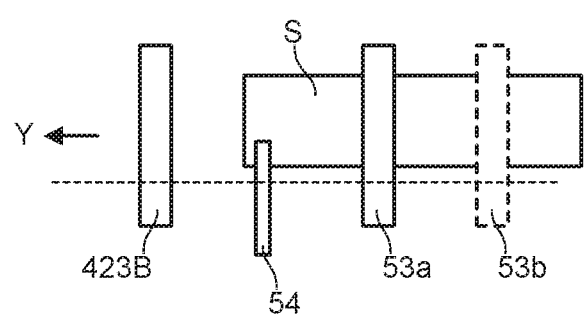
FIGS. 3A and 3B are diagrams describing conventional control of registration displacement, FIG. 3A showing a state before movement of a registration roller pair, FIG. 3B showing a state after the movement of the registration roller pair.
Figure 3B:
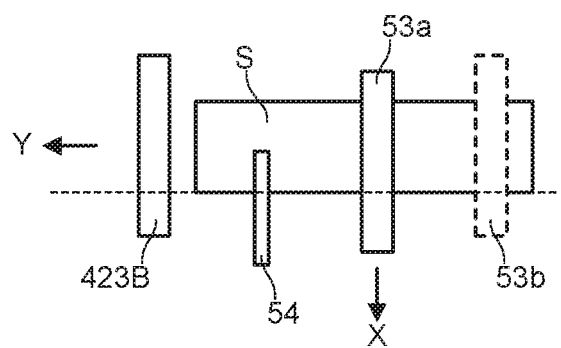

FIG. 3 (FIGS. 3A and 3B) are diagrams describing the conventional control of registration displacement when conveyed sheet S is a long sheet. Arrow Y denotes the conveyance direction of the sheet A dotted line denotes the position of a reference end of the sheet detected by line sensor 54. Arrow X denotes the displacement direction of registration roller pair 53a. Further, a roller separates from sheet S is drawn with the dotted line.

FIG. 3A illustrates an example in which sheet S (long sheet) is so conveyed as to be passed obliquely rightward (toward far side) as a whole in a position upstream of backup roller 423B, which forms the secondary transfer nip. In this case, the control unit 100 senses the direction and the amount of the deviation of the side edge of sheet S from a signal output from line sensor 54 and calculates the direction and the amount of the displacement of registration roller pair 53a from the result of the sensing. As shown in FIG. 3B, control unit 100 then performs control of displacing registration roller pair 53a in direction X orthogonal to sheet conveyance direction Y according to the calculation values.

To perform the registration displacement control, control unit 100 further causes rollers upstream of registration roller pair 53a (loop rollers 53b in example illustrated in FIGS. 3A and 3B) in the conveyance direction to be separate away from sheet S. Sheet S is therefore conveyed only with registration roller pair 53a before and after the period for which the registration roller pair 53a is displaced.

On the other hand, in the registration displacement control of related art, in which registration roller pair 53a is displaced only before the front end of sheet S is thrust into the secondary transfer nip, the sub scanning obliqueness (such as tilt) of sheet S that occurs after the registration displacement undesirably causes deviation, distortion, and other problems of an image. In the case of a long sheet, in particular, the longer sheet S is, the more often the problems occur.

In a case where skew correction using registration roller pair 53a is performed on the aforementioned inclination (tilt) of sheet S, the inclination of the front end side of sheet S is corrected, but the inclination of the rear end side of the sheet cannot be corrected in the case of a long sheet. Distortion remains between the front end side and the rear end side, and the sub scanning obliqueness is likely to occur.

To address the problem described above, it is conceivable to repeatedly perform registration displacement after the front end of sheet S (long sheet) is thrust into the secondary transfer nip.

The registration displacement control of related art is, however, basically so performed that line sensor 54 senses deviation of the side edge of sheet S from the reference position, the amount of displacement of registration roller pair 53a is determined from the result of the sensing, and registration roller pair 53a is displaced by the determined value. Therefore, in the registration displacement control of related art, the side edge of sheet S deviates from the reference position in some cases when the displacement is stopped.

In a case where sheet S has a long size of in the conveyance direction, in particular, when registration roller pair 53a is displaced, the secondary transfer nip and the fixing members downstream of registration roller pair 53a and other conveyance rollers upstream of registration roller pair 53a that include no separation mechanism (such as sheet feed roller of optional apparatus) are in contact with or pressurized against the sheet in some cases. In such cases, the registration displacement control of related art, in which registration roller pair 53a is displaced only by the amount of deviation of the side edge of sheet S sensed with line sensor 54, tends to result in excess or shortage of the amount of displacement.

Although the obliquity manner or the amount of obliqueness of the sub scanning obliqueness varies as described above due to individual differences between machines, such as the alignment and the difference between the depths of the rollers, the obliquity manner or the amount of obliqueness is not significantly changed after image forming apparatus 1 is installed in a room or the like, and the obliquity manner or the amount of obliqueness is constant in each machine. That is, as for the sub scanning obliqueness, after image forming apparatus 1 is installed in a room or any other place, the direction in which sheet S deviates, the timing when sheet S starts deviating, and other factors are known (can be estimated) in advance in many cases based on peculiarities and other factors specific to each apparatus.

The present inventors have conducted a variety of experiments based on the knowledge described above and found that the start of registration displacement action for correction of the sub scanning obliqueness does not basically need to rely on the result of the sensing performed by line sensor 54 and the registration displacement control only needs to be performed based on preset values of, for example, the direction in which registration roller pair 53a is displaced.

In the configuration described below, the control unit 100 does not basically use a value sensed with line sensor 54 to determine the start of the displacement of registration roller pair 53a but performs the registration displacement control by using pre-specified fixed values (preset values) of the direction in which registration roller pair 53a is displaced, the number of displacement actions, the amount of each of the displacement actions, the timing when registration roller pair 53a is displaced (displacement point), and other factors.

In the present embodiment, the number of displacement points for each sheet S, the direction and the amount of displacement of registration roller pair 53a at each of the displacement points, and other factors can be arbitrarily defined as the preset values.

On the other hand, in a case where registration roller pair 53a is always displaced in one direction (leftward, for example) at each of the displacement points, and the side edge of sheet S undesirably travels beyond a target position (what is called overrun occurs) when the displacement is stopped, the side edge of sheet S cannot be returned to the target position in some cases.

In view of the problem described above, in the present embodiment, the registration displacement is performed by using a preset value so specified that registration roller pair 53a is displaced both rightward and leftward (in width direction) relative to single sheet S. Specifically, registration displacement is so performed by using the preset value so specified that registration roller pair 53a is displaced multiple times (N times, for example, five times) relative to single sheet S and the side edge of sheet S is alternately moved in a first direction in which the side edge moves toward the target position and in a second direction opposite the first direction.

In addition, in the present embodiment, the control unit 100 starts displacing registration roller pair 53a, that is, moving registration roller pair 53a in the width direction of sheet S and then performs stop control in which displacement of registration roller pair 53a is stopped based on the result of the detection performed by line sensor 54.

Figures 4A, 4B:
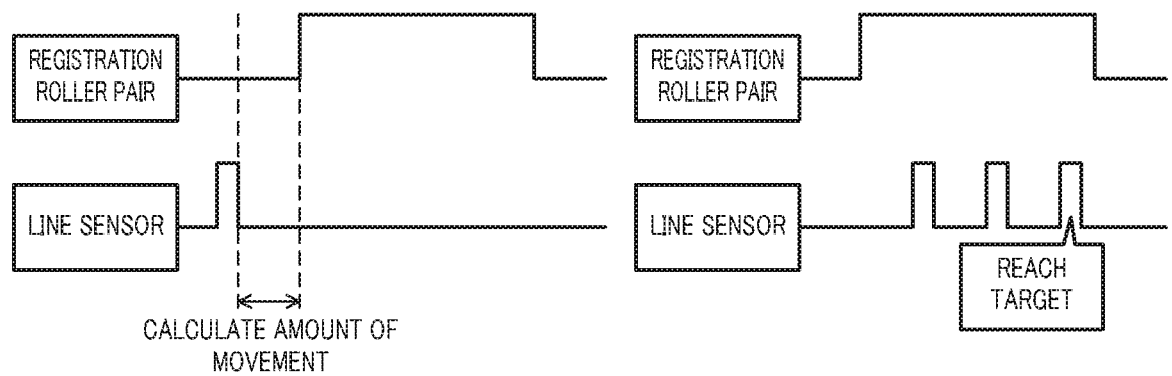
FIGS. 4A and 4B are timing charts illustrating examples of the action of a line sensor, FIG. 4A illustrating registration displacement of related art and FIG. 4B illustrating registration displacement in the present embodiment.

A basic method for performing the registration displacement control (stop control) in the present embodiment will be described below with reference to the timing chart illustrated in FIGS. 4A and 4B in comparison with the control method of related art. FIG. 4A illustrates an example of a signal sequence in the registration displacement control in the control method of related art, and FIG. 4B illustrates an example of a signal sequence in the registration displacement control in the present embodiment. FIGS. 4A and 4B each chronologically illustrate a control signal output for the displacement of registration roller pair 53a and a control signal output to the line sensor 54, and the state in which the signal has risen is an ON state. That is, registration roller pair 53a is moving in the width direction during the displacement ON period, and the side edge of sheet S is sensed during the ON state of line sensor 54.

In the registration displacement control of related art, when a print job starts, sheet S is conveyed toward the secondary transfer nip, the front end of sheet S passes by the position of line sensor 54, and then line sensor 54 can sense the position of side edge of sheet S (positional deviation). Control unit 100 therefore calculates the amount of displacement of registration roller pair 53a, that is, the displacement direction of registration roller pair 53a and the amount of movement thereof from the result of the sensing (see FIG. 4A) and performs the registration displacement control in which registration roller pair 53a is moved and stopped in the sheet width direction in accordance with the result of the calculation.

That is, in the registration displacement control of related art, line sensor 54 is operated before the displacement of registration roller pair 53a starts, the amount of displacement of registration roller pair 53a is calculated during the period labeled with the double-head arrow illustrated in FIG. 4A, and the displacement of registration roller pair 53a starts after the calculation, as illustrated in FIG. 4A. Control unit 100 then stops displacing registration roller pair 53a at the timing when registration roller pair 53a is displaced by the calculated amount of displacement (see FIG. 4A). In other words, in the registration displacement control of related art, the result of the sensing of the side edge of sheet S performed by line sensor 54 is used only for the start of the displacement of registration roller pair 53a and the calculation of the amount of displacement thereof.

Therefore, in the registration displacement control of related art, the period from the sensing performed by line sensor 54 to the start of the movement of registration roller pair 53a is a time lag resulting from the period required for the calculation of the amount of displacement of registration roller pair 53a, as illustrated with the double-head arrow in FIG. 4A. The longer the time lag is, the more likely the amount of positional deviation at the time of the measurement differs from the amount of positional deviation at the start of the displacement (error), so that the side edge of sheet S is undesirably likely to deviate from the correct position (see dotted lines in FIGS. 3A and 3B) when the movement of registration roller pair 53a is stopped.

Further, in the registration displacement control of related art, when the displacement of registration roller pair 53a starts (see FIG. 4A), the amount of displacement of registration roller pair 53a (amount of movement in width direction) has been already determined. Therefore, in a case of passage of a long sheet that is long in the conveyance direction, for example, in a case where the front end or rear end of sheet S is pressed with not only registration roller pair 53a but another roller or any other component (see FIG. 5A), slippage of sheet S relative to registration roller pair 53a occurs during the displacement, and a situation in which the positional deviation cannot be eliminated by the determined amount of displacement occurs in some cases.

As described above, according to the registration displacement control of related art using line sensor 54 for the calculation of the amount of displacement of registration roller pair 53a and the start of the displacement, the side edge of sheet S does not coincide with the correct position when the displacement of registration roller pair 53a is stopped (see FIG. 4A). In the registration displacement control of related art, in particular, the error is likely to occur in the case where a long sheet is conveyed as sheet S.

In contrast, in the registration displacement control in the present embodiment, since line sensor 54 is used to stop the displacement of registration roller pair 53a, the frequency of the error described above in the registration displacement can be greatly reduced.

Specifically, in the present embodiment, the displacement of registration roller pair 53a (movement in width direction) is stopped at the timing when the side edge of sheet S coincides with the target position (see dotted line in FIG. 3A). FIG. 4B illustrates a case where after the start of the displacement of registration roller pair 53a, the side edge of sheet S is sensed with line sensor 54 (sensing operation) multiple times in a constant cycle, the side edge of sheet S coincides with the target position in the third sensing operation, and registration roller pair 53a is then stopped. As another control example, control unit 100 may calculate (estimate) the timing when the side edge of sheet S reaches the target position from the result of the first sensing operation and perform the second sensing operation at the estimated timing. Still instead, control unit 100 may omit the second sensing operation and stop the movement (displacement) of registration roller pair 53a at the estimated timing. The stop control described above allows reduction in the number of actions of turning on line sensor 54 for a longer life thereof.

As described above, according to the present embodiment, in which the sensing signal from line sensor 54 is used to stop the displacement of registration roller pair 53a, the movement of registration roller pair 53a can be stopped at the timing when the side edge of sheet S coincides with the target position. The control described above allows large reduction in the frequency of the aforementioned error that occurs when the registration displacement is stopped.

Figure 5A:
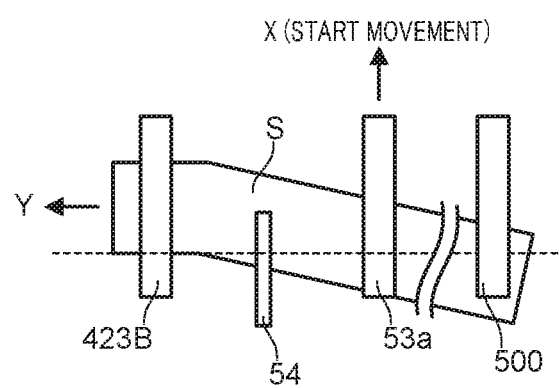
FIGS. 5A and 5B are diagrams describing an outline of the registration displacement control in the present embodiment in a case where a long sheet is conveyed, FIG. 5A illustrating the state before the movement of the registration roller pair and FIG. 5B illustrating the state after the movement of the registration roller pair.
Figure 5B:
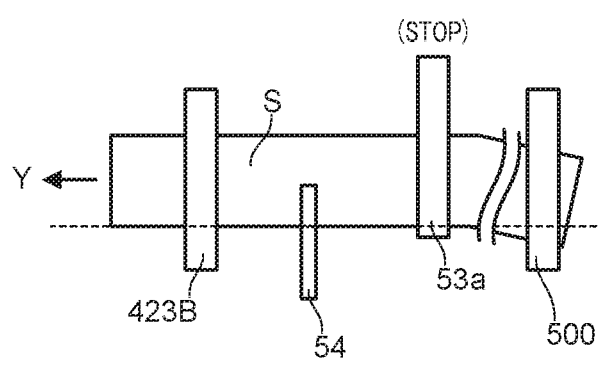

The displacement stop control method in the present embodiment in the case where a long sheet is conveyed as sheet S will be described with reference to FIGS. 5A and 5B. In FIGS. 5A and 5B, the sheet conveyance direction is indicated by the arrow Y, the position of the sheet reference edge sensed with line sensor 54 is indicated by the dotted line, and the displacement direction of registration roller pair 53a is indicated by the arrow X. In this example, it is assumed that a sheet feeding apparatus as an optional apparatus that is not illustrated is connected to image forming apparatus 1 illustrated in FIG. 1, and sheet feed roller 500 of the sheet feeding apparatus is disposed upstream of registration roller pair 53a.

In the registration displacement of related art, loop rollers 53b and other rollers located upstream of registration roller pair 53a and other rollers are so controlled as to be separate away from sheet S, as described above with reference to FIGS. 3A and 3B. In other words, in the registration displacement control of related art, only registration roller pair 53a is pressed against sheet S, and registration roller pair 53a is displaced with no thrust resistance. On the other hand, in the case of sheet S long in the conveyance direction (long sheet), when the front end of the sheet is sandwiched by registration roller pair 53a, the rear end of the sheet is pressed against sheet feed roller 500 or any other sheet conveying member in some cases, as illustrated in FIGS. 5A and 5B. In such cases, the position of the rear end of the sheet cannot be corrected.

The registration displacement control in the present embodiment, in which the side edge of sheet S can be aligned with the target value, that is, the reference position even in the state in which sheet S is pressed by a plurality of rollers upstream and downstream of registration roller pair 53a as described above, is effective particularly in this case. The registration displacement control in the present embodiment is therefore preferably performed after the front end of sheet S enters the secondary transfer nip formed by backup roller 423B and other components, as illustrated in FIGS. 5A and 5B.

On the other hand, in the case of sheet S short in the conveyance direction, entire sheet S can be displaced (moved in width direction) in a single displacement action, whereas in the case of a long sheet long in the conveyance direction, sheet S is not entirely moved in a single displacement action in some cases. In other words, in the case of a long sheet that is sheet S long in the conveyance direction, even when registration roller pair 53a is displaced only in one direction (rightward or leftward) and stopped when the side edge of sheet S coincides with the target position in a single displacement action, the amount of displacement could be still insufficient.

Specifically, in image forming apparatus 1, the secondary transfer nip is located upstream of line sensor 54 in the sheet conveyance direction, as illustrated in FIG. 1 and other figures. In contrast, in the present embodiment, the side edge of sheer S is basically aligned with the target position in the position of line sensor 54. Therefore, assuming a case where the entire side edge of the long sheet, for example, deviates rightward or leftward and a sheet portion upstream of registration roller pair 53 is pressed by the sheet feed roller or any other roller, the amount of displacement could be insufficient even when the side edge of sheet S is aligned with the target position. That is, even when the side edge of sheet S reaches the target position in the position of line sensor 54, the side edge of sheet S in the secondary transfer nip is unlikely to reach the correct position.

To address the problem, in the present embodiment, in the case of a long sheet having a length greater than a predetermined value in the direction in which sheet S is conveyed, registration displacement control is so performed that the preset values described above are used to displace registration roller pair 53a both rightward and leftward and the displacement in the two directions is stopped based on the result of the sensing performed by line sensor 54.

Specifically, control unit 100 starts first displacement that displaces registration roller pair 53a in the direction in which the side edge of sheet S is directed toward the target position in accordance with the displacement timing (displacement point) and the displacement direction specified as the preset values, causes line sensor 54 to operate during the first displacement, and stops the first displacement based on the result of the sensing performed by line sensor 54. Control unit 100 subsequently starts second displacement that displaces registration roller pair 53a in the direction opposite the direction of the first displacement in accordance with the displacement timing (displacement point) and the displacement direction specified as the preset values, causes line sensor 54 to operate during the second displacement, and stops the second displacement based on the result of the sensing performed by line sensor 54. The control of the first and second displacement will be described later in detail.

The case where the length of sheet S in the conveyance direction is greater than the predetermined value is a case where sheet S cannot be housed in sheet feed tray units 51a to 51c in the apparatus or cannot housed also in a sheet feed tray of the sheet feeding apparatus that is not illustrated but is connected as an optional apparatus to image forming apparatus 1. An example of such a case is a case where the size of sheet S in the conveyance direction is greater than 487.7 mm. A long sheet having the size described above can be fed when a sheet feeding apparatus dedicated to the long sheet is connected to image forming apparatus 1.

The case where the length of sheet S in the conveyance direction is greater than the predetermined value is instead a case where sheet S has a length greater than or equal to the distance from the position of registration roller pair 53a to a roller that is located upstream of registration roller pair 53a in the conveyance direction, has no pressing/separating mechanism, and therefore always presses the sheet In the case where the length of sheet S in the conveyance direction is smaller than or equal to the predetermined value described above, control unit 100 performs the registration displacement control of related art described above with reference to FIG. 4A and other figures, that is, displaces registration roller pair 53a by the amount of displacement based on the result of the sensing performed by line sensor 54.

An example of the registration displacement control in the case where a long sheet that is sheet S having a length in the conveyance direction greater than the predetermined value (487.7 mm, for example) will be described with reference to FIGS. 6A to 6D.

At the time of execution of a print job, sheet S (long sheet) is fed, for example, from the sheet feeding apparatus dedicated to the long sheet to image forming apparatus 1 and successively conveyed via conveyance path unit 53 to registration roller pair 53a and the secondary transfer nip, as described above with reference to FIGS. 5A and 5B. FIG.

6A illustrates a case where the side edge of sheet S deviates rightward in the state in which the position of the side edge of sheet S can be sensed with line sensor 54. Loop rollers 53b are separated from sheet S before the registration displacement action, as indicated by the broken line in FIG. 6A.

Figure 6A:
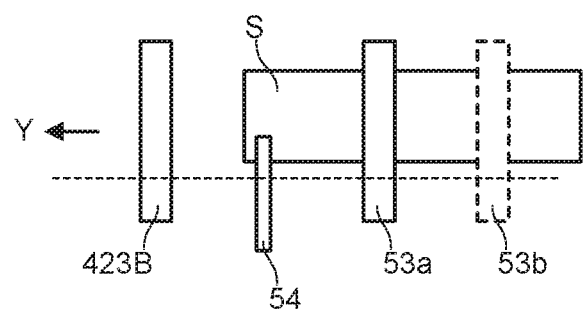
FIGS. 6A to 6D are diagrams describing displacement actions in the present embodiment, FIG. 6A illustrating the state in which the side edge of a sheet can be sensed, FIG. 6B illustrating the direction in which the registration roller pair is displaceable, FIG. 6C illustrating the displacement in a first direction, and FIG. 6D illustrating the displacement in a second direction opposite the first direction.
Figure 6B:
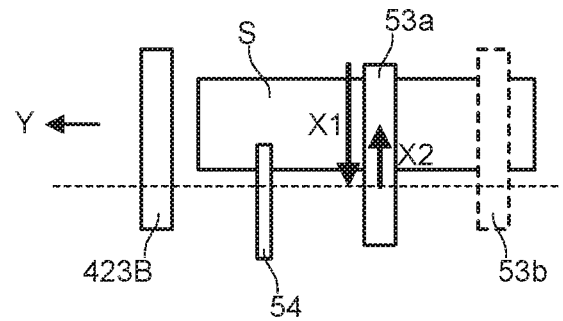

FIG. 6B illustrates a state immediately before the start of the displacement of registration roller pair 53a. Registration roller pair 53a is configured to be capable of making reciprocating motion in the width direction (both rightward and leftward) perpendicular to the direction of arrow Y, which is the sheet conveyance direction, as indicated by arrows X1 and X2 in FIG. 6B.

Figure 6C:
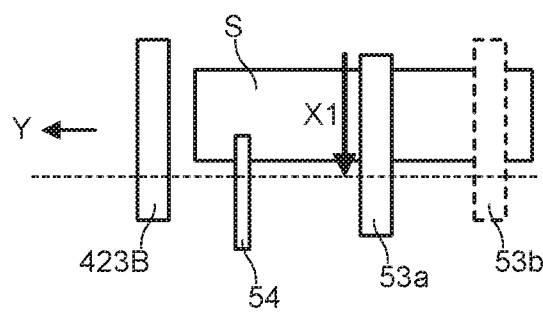

At this point, control unit 100 starts displacing registration roller pair 53a in the first direction (leftward, that is, in direction of arrow X1 in example illustrated in FIG. 6C) in which the side edge of sheet S is directed toward the target position (see dotted line in FIG. 6C) in accordance with the preset values, as illustrated in FIG. 6C. Control unit 100 subsequently causes line sensor 54 to operate to sense the position of the side edge of sheet S (see FIG. 4B) and stops the displacement of registration roller pair 53a based on the result of the sensing. To solve or otherwise address the aforementioned insufficient displacement of the rear end of sheet S, control unit 100 may stop the displacement of registration roller pair 53a in a position where the side edge of sheet S is slightly beyond the target position (see FIG. 6D).

Figure 6D:
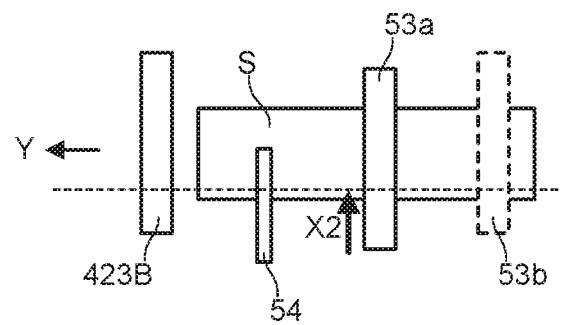

Further, from this state, control unit 100 starts displacing registration roller pair 53a in the second direction opposite the first direction (rightward, that is, in direction of arrow X2 in example illustrated in FIG. 6D) accordance with the preset values, as illustrated in FIG. 6D. Control unit 100 subsequently causes line sensor 54 to operate to sense the position of the side edge of sheet S (see FIG. 4B) and stops the displacement of registration roller pair 53a based on the result of the sensing. At this point, control unit 100 can stop the displacement of registration roller pair 53a in a position where the side edge of sheet S is slightly beyond the target position (see FIG. 6D), as described above. Instead, control unit 100 may stop the displacement of registration roller pair 53a in such a way that the side edge of sheet S reaches, that is, coincides with the target position.

For example, in a case where five displacement actions (five displacement points) are specified as one of the present values for each sheet S, control unit 100 displaces registration roller pair 53a in the direction of arrow X1, the direction X2, the direction X1, the direction X2, and the direction X1 in the order presented. In each of these displacement actions, control unit 100 stops the displacement of registration roller pair 53a based on the result of the sensing performed by line sensor 54 when the amount of displacement specified by the preset value is achieved.

During the series of actions described above, in the displacement action in the first direction (direction of arrow X1) or the second direction (direction of arrow X2), the deviation position (amount of deviation) in the case where the side edge of sheet S is offset from the position of the dotted line in FIGS. 6A to 6D can be arbitrarily set as the preset value. The deviation position (amount of deviation) may, for example, be adjusted by the user via a setting screen or any other means that is not illustrated.

As for the amounts of displacement of registration roller pair 53a (movement distance in width direction) in the displacement actions in the first and second directions, the amount of displacement in the displacement action in the first direction is greater in many cases. Control unit 100 may therefore displace registration roller pair 53a in such a way that the displacement speed in the first direction is greater than the displacement speed in the second direction.

As described above, in the registration displacement control in the present embodiment performed on single sheet S (long sheet), the operation of start of the displacement in the first direction and stop of the displacement based on the result of the sensing performed by line sensor 54 and the operation of start of the displacement in the second direction and stop of the displacement based on the result of the sensing performed by line sensor 54 are alternately performed in accordance with the preset value. The present embodiment, in which registration roller pair 53a is so displaced as to make reciprocating motion rightward and leftward, effectively prevents occurrence of a poor image due to the sub scanning obliqueness particularly in the case of a long sheet.

FIGS. 6A to 6D illustrate the start and stop of both the rightward and leftward displacement actions before the front end of sheet S is thrusted into the secondary transfer nip for ease of description. On the other hand, when a long sheet is actually conveyed, the sub scanning obliqueness (positional deviation) after the front end of sheet S enters the secondary transfer nip is particularly a problem in many cases. That is, since the conveying members press sheet S both on the upstream and downstream sides of registration roller pair 53a after the front end of sheet S enters the secondary transfer nip, the error in the registration displacement action (insufficient displacement in usual case) is more likely to occur than before the front end of sheet S is thrusted into the secondary transfer nip.

Therefore, in the present embodiment, in the case where the length of sheet S in the conveyance direction is greater than the predetermined value described above, the series of actions of the first and second displacement described above with reference to FIG. 6A to 6D is performed basically after the front end of sheet S enters the secondary transfer nip. The registration displacement control in which both the first and second displacement actions are performed may be performed before the front end of sheet S is thrusted into the secondary transfer nip. In this case, however, the control using the method of related art described above, that is, the control in which registration roller pair 53a is displaced by the amount of displacement based on the result of the sensing performed by line sensor 54 (see FIG. 4A) may be basically performed.

In the case where the length of sheet S in the conveyance direction is smaller than or equal to the predetermined value described above, the user can optionally perform the registration displacement control formed of the first and second displacement, for example, via a user selection screen that is not illustrated. Instead, control unit 100 may determine whether or not the registration displacement control formed of the first and second displacement is performed based on the type of sheet S (such as basis weight).

An example of the preset value will be described below in more detail. The start timing of each of the displacement actions of registration roller pair 53a performed after sheet S is thrusted into the secondary transfer nip and until sheet S exits out of a registration nip is specified as the preset value. That is, the preset value is a specified value representing the timing when the side edge of registration roller pair 53a starts being displaced toward the target position (displacement timing) after the start of the thrust of sheet S into the secondary transfer nip. A plurality of displacement timings can be set for one piece of sheet S. Intervals between the timings can be arbitrarily set when a plurality of displacement timings are set for one piece of sheet S. Overall, the preset values include a value that specifies, throughout the entire length of sheet S in the conveyance direction, the timing when or a point on sheet S where registration roller pair 53*a* starts moving in the sheet width direction.

For example, in the case where sheet S is a long sheet, a plurality of displacement start timings may be specified (set) as the preset value so that the series of actions formed of the first and second displacement described above is repeatedly performed.

In the case of a long sheet that is sheet S having a length in the conveyance direction greater than the predetermined value (487.7 mm, for example), not only may a plurality of displacement start timings be specified (set) as the preset value so that the series of actions formed of the first and second displacement described above is repeatedly performed in the period for which the rear end of sheet S is pressed by the sheet feed roller and other components, but the amount of displacement at each of the displacement timings may be set. The settings also allow the rear end of sheet S to approach the target position when the displacement of registration roller pair 53*a* both rightward and leftward is repeatedly performed.

Further, a value representing the period from the stop of the first displacement to the start of the second displacement may be specified as one of the preset values. That is, in the case of an long sheet that is sheet S having a length greater than the predetermined value (487.7 mm, for example), the second displacement is not initiated immediately after the completion of the first displacement, but the second displacement is initiated a predetermine period after the completion of the first displacement, whereby the rear end (of long sheet) is more likely to approach the target position in some cases. The value representing the period from the stop of the first displacement to the start of the second displacement can be specified on a displacement timing (displacement point) basis.

Further, the preset values may include a value representing the displacement speed of registration roller pair 53*a* in the first or second displacement described above. The displacement speed can be specified on a displacement timing (displacement point) basis.

On the other hand, in a case where the image forming conditions in the execution of a print job vary, for example, the environment around image forming apparatus 1, the type of sheet S to be used, and other factors vary, the timing when the sub scanning obliqueness of sheet S occurs may vary. In this case, a fixed start timing of the displacement of registration roller pair 53*a* and a fixed time interval between the displacement actions result in the error, that is, the start timing of the first displacement could be delayed with respect to the occurrence of the sub scanning obliqueness or the reverse situation could occur. In other words, it is believed that a preferable timing of each of the displacement actions of registration roller pair 53*a* varies in accordance with the image forming conditions.

Control unit 100 may therefore change the timings of the first and second displacement actions in accordance with the image forming conditions. For example, control unit 100 corrects the preset values in such a way that the start timing of each of the actions of the displacement of registration roller pair 53*a* and the inter-displacement interval specified by the preset values are changed. In this case, control unit 100 adds a correction value or a correction coefficient (ratio) to each of the present values or multiplies each of the preset values by a correction value or a correction coefficient (ratio) to change the present value for the registration displacement control using the changed preset values.

The image forming conditions may include a variety of conditions, such as the type of sheet S (length, width, surface glossiness, and basis weight (rigidity), for example), the environment around image forming apparatus 1 (typically temperature/humidity conditions), the coverage (coverage rate), and the printed surface in the double-sided printing (first or second surface). In consideration of the image forming conditions described above, the correction values and the correction coefficients described above are preferably registered in individual tables according to the conditions. In this case, control unit 100 identifies the type of sheet S or any other factor before a print job is executed, reads a correction value or a correction coefficient from a corresponding table, changes the preset value, and performs the registration displacement control using the changed preset value.

Instead, the displacement start timing and the inter-displacement interval may be specified in advance as the preset values according to the image forming conditions. In view of the fact that the image forming conditions are formed of a large number of factors as described above, the preset values may be registered in individual tables according to the conditions. In this case, control unit 100 identifies the type of sheet S and other factors at the time of execution of a print job, reads a preset value from the corresponding table, and performs the registration displacement control.

Figure 7:
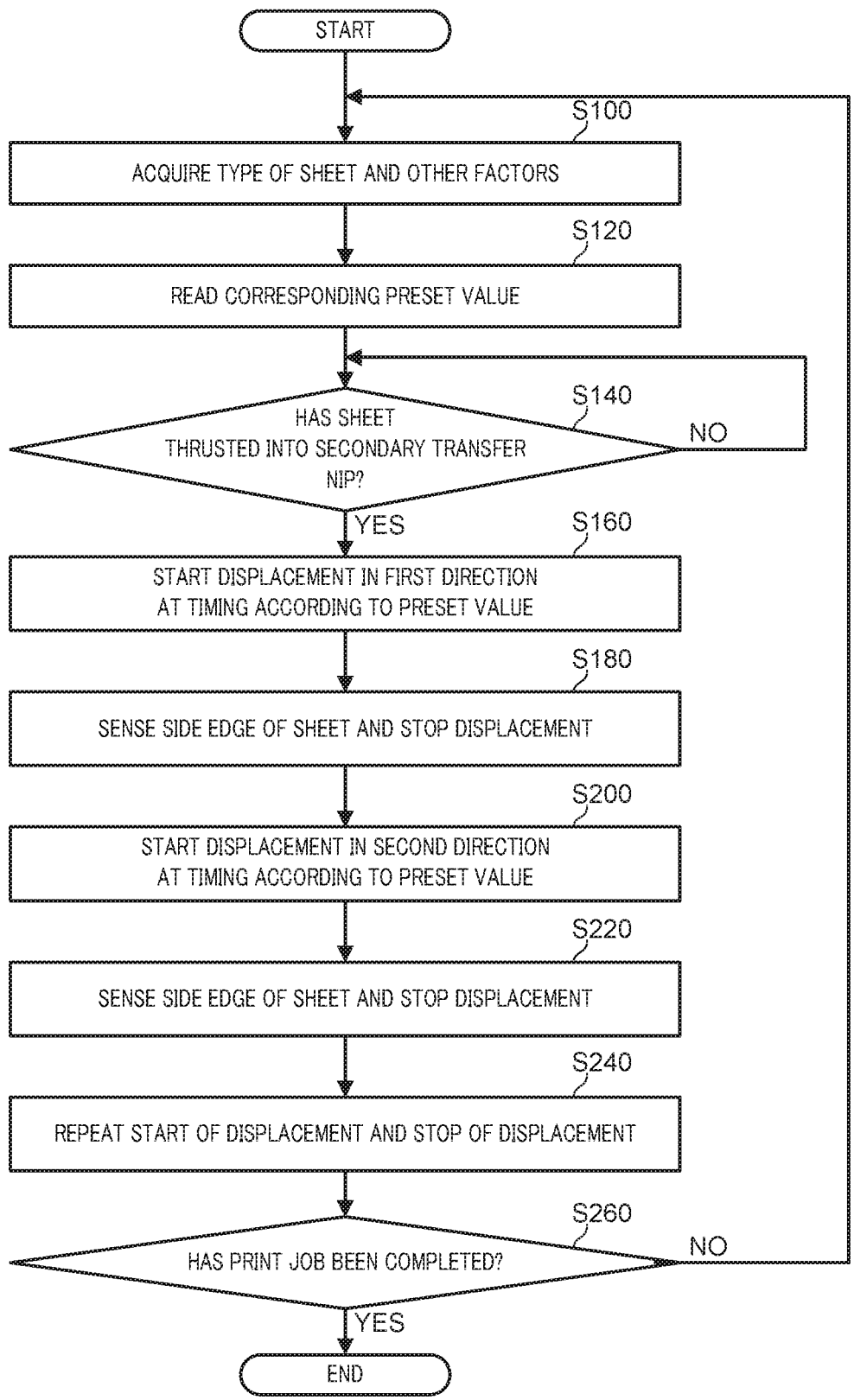
FIG. 7 is a flowchart illustrating an example of conveyance control relating to the registration displacement in the image forming apparatus according to the present embodiment.

An example of the actions in the displacement control of registration roller pair 53*a* and in turn sheet S in image forming apparatus 1 will be described below with reference to the flowchart of FIG. 7. The flowchart illustrated in FIG. 7 is a flowchart in the case of a long sheet that is sheet S having a size in the conveyance direction greater than 487.7 mm, and the actions illustrated in the flowchart are performed on each sheet S on which an image is formed in the execution of a print job in the case where the aforementioned sheet feeding apparatus dedicated to a long sheet is connected to image forming apparatus 1.

At the time of the execution of a print job, control unit 100 acquires information on the type of sheet S on which the printing is performed (such as length, width, glossiness, and basis weight (rigidity)) from user set information on the print job (step S100).

In step S120, control unit 100 reads the preset value registered in a table corresponding to the acquired image forming condition (type of sheet in this example) and sets the direction and the amount of displacement of registration roller pair 53*a* at each displacement point.

Control unit 100 then waits until sheet S is thrusted into the secondary transfer nip (step S140, NO) and moves to step S160 once sheet S is thrusted into the secondary transfer nip (step S140, YES).

In step S160, control unit 100 starts the displacement of registration roller pair 53*a* in the first direction (first displacement) at the timing and the direction according to the set value, that is, the preset value (see FIG. 6C).

The control described above causes registration roller pair 53*a* to be displaced at the timing according to the preset value relative to sheet S thrusted into the secondary transfer nip in the direction in which the positional deviation of sheet S is corrected, so that sheet S is displaced in the width direction thereof in response to the displacement.

In this process, the front end of sheet S (long sheet) is sandwiched by the secondary transfer nip and sheet S is conveyed while the toner images are formed, whereas the sheet is conveyed with the rear end thereof pressed by sheet feed roller 500 in the sheet feed tray unit in the long sheet optional apparatus (see FIG. 5A).

In the subsequent step S180, control unit 100 turns on line sensor 54 to sense the position of the side edge of sheet S and stops the displacement of registration roller pair 53a in the first direction based on the result of the sensing performed by line sensor 54 when the amount of displacement specified by the preset value is achieved. In the displacement action in the first direction, control unit 100 does not stop registration roller pair 53a at the timing when the side edge of sheet S reaches the target position (reference position) but can stop registration roller pair 53a in a position where the side edge is slightly beyond the reference position (what is called overrun position).

Having stopped registration roller pair 53a, control unit 100 starts displacing registration roller pair 53a (second displacement) at the following displacement timing (displacement point) specified by the preset value in the second direction opposite the first direction (see FIG. 6D) (Step S200). In the displacement in the second direction, control unit 100 displaces registration roller pair 53a at a displacement speed smaller than the displacement speed in the first direction.

In subsequent step S220, control unit 100 turns on line sensor 54 again to sense the position of the side edge of sheet S and stops the displacement of registration roller pair 53a based on the result of the sensing performed by line sensor 54 when the amount of displacement specified by the preset value is achieved.

Control unit 100 then repeats the start of the displacement of registration roller pair 53a in the timing according to the preset value and the stop of the displacement based on the result of the sensing performed by line sensor 54 in accordance with the setting made in step S120 (step S240).

The control described above allows the side edge of sheet S in the region of the secondary transfer nip to be accurately aligned with the target position (reference position), whereby occurrence of a poor image is effectively avoided. As a result, the sub scanning obliqueness of the sheet can be more properly corrected.

After completion of the registration displacement performed on a single sheet multiple times specified by the preset value, control unit 100 evaluates in step S260 whether or not the print job is completed. In a case where the result of the evaluation shows that the print job has not been completed (NO in step S260), control unit 100 returns to step S100 and performs the displacement of registration roller pair 53a and the printing, such as image formation, on the following sheet S. On the other hand, in a case where the result of the evaluation shows that the print job has been completed (YES in step S260), control unit 100 terminates the series of processes described above.

As described above in detail, the present embodiment allows correction of the sub scanning obliqueness of sheet S resulting from misalignment, differences in diameter among the rollers in the width direction, and other factors and hence prevent occurrence of deviation of an image and other problems resulting from the sub scanning obliqueness. Further, the present embodiment, in which the displacement of registration roller pair 53a is stopped based on the result of the sensing of the side edge of sheet S performed by line sensor 54, allows more proper correction of the sub scanning obliqueness of a sheet than in the registration displacement control of related art.

Further, the present embodiment, in which the series of control actions formed of the first displacement (start and stop) and the second displacement (start and stop) of registration roller pair 53a are performed, allows alignment of the side edge of a long sheet in the region of the secondary transfer nip with the correct position. The present embodiment therefore allows more proper correction of the sub scanning obliqueness of sheet S than in the control of related art, that is, the correction to be made with effective prevention of occurrence of a poor image.

(Embodiment 2)

Embodiment 2 of the image forming apparatus will next be described with reference additionally to FIGS. 8A to 8D to FIG. 10. The schematic configuration and control system of the image forming apparatus in Embodiment 2 are the same as those in Embodiment 1 (see FIGS. 1 and 2) and will not be described.

In view of the problems described above with reference to FIGS. 3A and 3B and other figures, in Embodiment 2, in the case where the length of sheet S in the conveyance direction is smaller than or equal to the preset value (predetermined value), the aforementioned registration displacement control that is the same as the registration displacement control of related art is performed, whereas in the case where the length of sheet S in the conveyance direction is greater than the predetermined value, the following registration displacement control (stop control) is performed. That is, the control unit 100 starts the displacement of registration roller pair 53a in the direction in which the side edge of sheet S is directed toward the target position based on the result of the sensing of the direction of deviation of the side edge of sheet S performed by line sensor 54 and then stops the displacement based on the result of the sensing performed by line sensor 54 when the side edge of sheet S reaches the target position.

That is, in the registration control, line sensor 54 is primarily used to stop the displacement of registration roller pair 53a, and only the direction of deviation of the position of sheet S is determined by using line sensor 54 but the amount of displacement is not calculated before the start of the displacement The case where the length of sheet S in the conveyance direction is greater than the predetermined value is a case where sheet S cannot be housed in sheet feed tray units 51a to 51c in the apparatus or cannot housed also in a sheet feed tray of the sheet feeding apparatus that is not illustrated but is connected as an optional apparatus to image forming apparatus 1. An example of such a case is a case where the size of sheet S in the conveyance direction is greater than 487.7 mm. A long sheet having the size described above can be fed when a sheet feeding apparatus (not illustrated) dedicated to the long sheet is connected to image forming apparatus 1.

The case where the length of sheet S in the conveyance direction is greater than the predetermined value is instead a case where sheet S has a length greater than or equal to the distance from the position of registration roller pair 53a to a roller that is located upstream of registration roller pair 53a in the conveyance direction, has no pressing/separating mechanism, and therefore always presses the sheet An overview of the registration displacement control in the present embodiment in the case of a long sheet that is sheet S having a length in the conveyance direction greater than the predetermined value (487.7 mm, for example) will be described with reference to FIGS. 8A to 8D and FIGS. 9A and 9B.

Figure 8A:
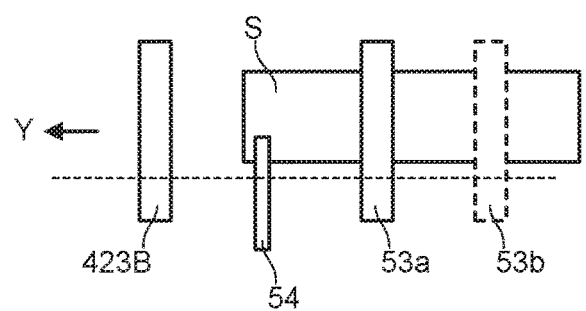
FIGS. 8A to 8D are diagrams describing the actions in the registration displacement control performed by an image forming apparatus according to Embodiment 2, FIG. 8A illustrating the state in which the side edge of a sheet can be sensed, FIG. 8B illustrating the direction in which the registration roller pair is displaceable, FIG. 8C illustrating leftward displacement, and FIG. 8D illustrating rightward displacement.

At the time of execution of a print job, sheet S (long sheet) is fed, for example, from the sheet feeding apparatus dedicated to the long sheet to image forming apparatus 1 and successively conveyed via conveyance path unit 53 to registration roller pair 53a and the secondary transfer nip, as described above. FIG. 8A illustrates a case where the side edge of sheet S deviates rightward in the state in which the position of the side edge of sheet S can be sensed with line sensor 54. Loop rollers 53b are separated from sheet S before the registration displacement action, as indicated by the broken line in FIG. 8A.

Figure 8B:
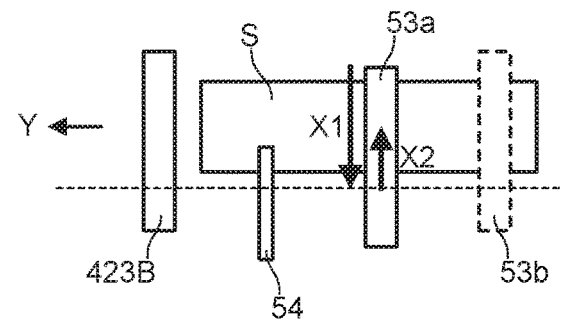

FIG. 8B illustrates the direction in which registration roller pair 53a is displaceable. As illustrated with arrow X1 and X2 in FIG. 8B, registration roller pair 53a is configured to be movable in the width direction (both rightward and leftward) perpendicular to the direction of arrow Y, which is the sheet conveyance direction.

Figure 8C:
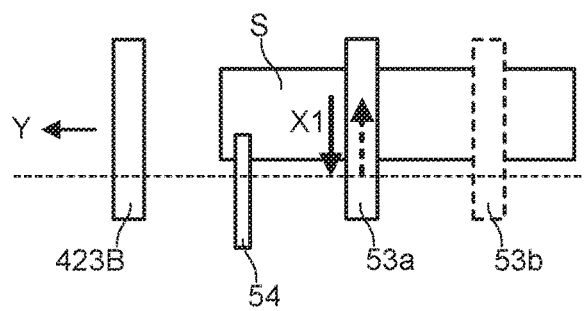

In the present embodiment, control unit 100 causes line sensor 54 to operate and compares the reference position (target position) with the position of the side edge of sheet S indicated by the signal output from line sensor 54 to determine the direction of deviation of the position of the side edge of sheet S. Based on the result of the determination, control unit 100 starts the displacement in such a way that registration roller pair 53a is displaced in the direction in which the side edge of sheet S is directed toward the target position. In the example illustrated in FIGS. 8A and 8B, since the side edge of sheet S is shifted rightward with respect to the target position indicated by the dotted line, registration roller pair 53a is so controlled as to start being displaced in the direction of the arrow X1 (leftward), as illustrated in FIG. 8C. Control unit 100 subsequently stop the displacement when the side edge of sheet S reaches the target position based on the result of the sensing performed by line sensor 54 after the start of the displacement.

Figure 9A:
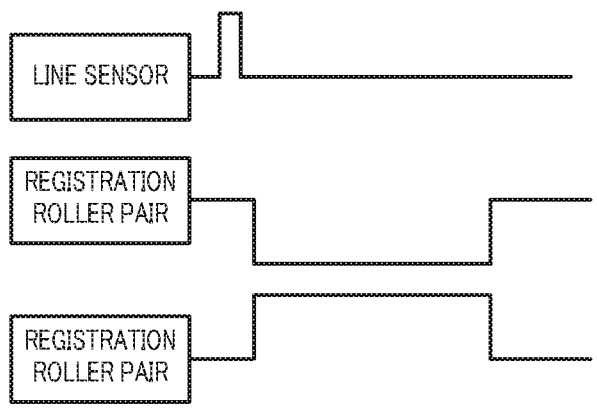
FIGS. 9A and 9B are signal sequence diagrams describing the registration displacement control in Embodiment 2, FIG. 9A describing a case where the registration roller pair is displaced rightward or leftward from the position at the time of position deviation sensing performed by a line sensor, and FIG. 9B illustrating a case where the registration roller pair is actually displaced.
Figure 9B:
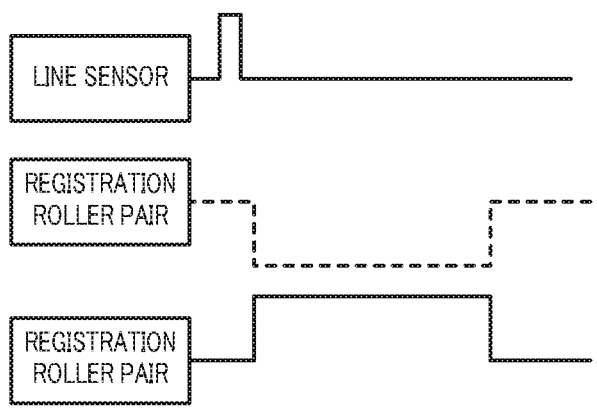

The content of the control performed when the displacement starts will be described in more detail with reference to FIGS. 9A and 9B. FIGS. 9A and 9B each chronologically illustrate control signals output for the displacement of registration roller pair 53a and a control signal output to line sensor 54.

Before the start of the displacement of registration roller pair 53a, control unit 100 turns on line sensor 54 and determines the direction of deviation of the position of sheet S (shift deviation) from the signal output from line sensor 54. Based on the result of determination, control unit 100 displaces registration roller pair 53a only in one of the rightward and leftward directions in such a way that registration roller pair 53a is displaced (moved in width direction) in the direction in which the side edge of sheet S is directed toward the target position, that is, the direction in which the positional deviation is eliminated. For example, control unit 100 outputs a falling control signal illustrated in FIG. 9A in the case where registration roller pair 53a is displaced leftward (in direction of arrow X1 in FIG. 8B), whereas outputting a rising control signal illustrated in FIG. 9A in the case where registration roller pair 53a is displaced rightward (in direction of arrow X2 in FIG. 8B).

At the start of the displacement of registration roller pair 53a, control unit 100 only needs to be capable of determining the direction of the deviation of sheet S and does not need to calculate the amount of deviation of sheet S and hence the amount of displacement of registration roller pair 53a. The present embodiment therefore allows reduction in the period from the detection performed by line sensor 54 to the start of the displacement of registration roller pair 53a (time lag), as compared with the control method of related art.

In the example illustrated in FIG. 8C, since the side edge of sheet S deviates rightward from the target position, control unit 100 outputs the rising control signal that starts displacing registration roller pair 53a leftward (in direction of arrow X1), as illustrated in FIG. 9B. Control unit 100 then causes line sensor 54 to operate again and stops the displacement of registration roller pair 53a when the side edge of sheet S reaches the target position.

Figure 8D:
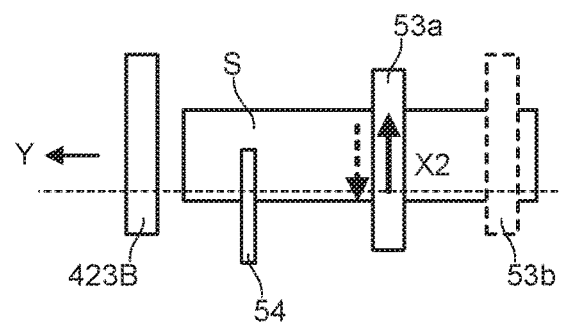

On the other hand, in the example illustrated in FIG. 8D, since the side edge of sheet S deviates leftward from the target position, control unit 100 outputs the falling control signal that starts displacing registration roller pair 53a rightward (in direction of arrow X2). Control unit 100 then causes line sensor 54 to operate again and stops the displacement of registration roller pair 53a when the side edge of sheet S reaches the target position.

FIGS. 8A to 8D illustrate the start and stop of the displacement actions before the front end of sheet S is thrusted into the secondary transfer nip for ease of description. On the other hand, when a long sheet is actually conveyed, the sub scanning obliqueness (positional deviation) after the front end of sheet S enters the secondary transfer nip is particularly a problem in many cases. That is, since the conveying members press sheet S both on the upstream and downstream sides of registration roller pair 53a after the front end of sheet S enters the secondary transfer nip, the error in the registration displacement action is more likely to occur than before the front end of sheet S is thrusted into the secondary transfer nip.

Therefore, in the present embodiment, in the case where the length of sheet S in the conveyance direction is greater than the predetermined value described above, the registration displacement control described above with reference to FIG. 8A to 8D and other figures is performed basically after the front end of sheet S enters the secondary transfer nip. The registration displacement control may be performed before the front end of sheet S is thrusted into the secondary transfer nip. In this case, however, the control using the method of related art described above, that is, the control in which registration roller pair 53a is displaced by the amount of displacement based on the result of the sensing performed by line sensor 54 may be basically performed.

In the case where the length of sheet S in the conveyance direction is smaller than or equal to the predetermined value described above, the user can optionally perform the registration displacement control described above with reference to FIGS. 8A and 8B and other figures, for example, via a user selection screen that is not illustrated. Instead, control unit 100 may determine whether or not the registration displacement control is performed based on the type of sheet S (such as basis weight).

The content of the control of stopping the displacement of registration roller pair 53a in the present embodiment will next be described in detail with reference also to FIG. 4B. In the present embodiment, the displacement of registration roller pair 53a (movement in width direction) is stopped at the timing when the side edge of sheet S coincides with the target position (see dotted line in FIG. 8A), as illustrated in FIG. 4B. FIG. 4B illustrates the case where after the start of the displacement of registration roller pair 53a, the side edge of sheet S is sensed with line sensor 54 (sensing operation) multiple times in a constant cycle, the side edge of sheet S coincides with the target position in the third sensing operation, and registration roller pair 53a is then stopped. As another control example, control unit 100 may calculate (estimate) the timing when the side edge of sheet S reaches the target position from the result of the first sensing operation and perform the second sensing operation at the estimated timing. Still instead, control unit 100 may omit the second sensing operation and stop the movement (displacement) of registration roller pair 53*a* at the estimated timing. The stop control described above allows reduction in the number of actions of turning on line sensor 54 for a longer life thereof.

As described above, according to the present embodiment, in which the sensing signal from line sensor 54 is also used to stop the displacement of registration roller pair 53*a*, the movement of registration roller pair 53*a* can be stopped at the timing when the side edge of sheet S coincides with the target position. The control described above allows large reduction in the frequency of the aforementioned error that occurs when the registration displacement is stopped.

On the other hand, depending on the type of sheet S, the environment in which the apparatus is installed, and other factors, there could be a case where the direction of deviation of sheet S (in other words, behavior of sheet S) cannot be predicted. To handle such a case, in the present embodiment, control unit 100 determines the direction in which sheet S deviates from the target position based on the sensing signal from line sensor 54 before the start of the displacement of registration roller pair 53*a* and prevents or inhibits the displacement of registration roller pair 53*a* at the start of the displacement in the direction opposite the direction in which the sheet position deviation is corrected. That is, in the configuration in which registration roller pair 53*a* is displaceable toward the opposite sides of the width direction of a sheet, control unit 100 determines, based on the sensing signal from line sensor 54 before the start of the displacement, not to move (displace) registration roller pair 53*a* in the opposite direction described above and displaces registration roller pair 53*a* only in the direction in which the sheet position deviation is corrected. The control described above allows the side edge of sheet S to quickly reach the target position.

The registration displacement control in the present embodiment in the case where sheet S having a size in the conveyance direction greater than the predetermined value (487.7 mm) (long sheet) is conveyed will next be described with reference to FIGS. 5A and 5B. In this example, it is assumed that a sheet feeding apparatus as an optional apparatus that is not illustrated is connected to image forming apparatus 1 illustrated in FIG. 1, and sheet feed roller 500 of the sheet feeding apparatus is disposed upstream of registration roller pair 53*a*.

In the registration displacement of related art, loop rollers 53*b* and other rollers located upstream of registration roller pair 53*a* and other rollers are so controlled as to be separate away from sheet S, as described above. In other words, in the registration displacement control of related art, only registration roller pair 53*a* is pressed against sheet S, and registration roller pair 53*a* is displaced with no thrust resistance. On the other hand, in the case of sheet S long in the conveyance direction (long sheet), when the front end of the sheet is sandwiched by registration roller pair 53*a*, the rear end of the sheet is pressed against sheet feed roller 500 or any other sheet conveying member in some cases, as illustrated in FIGS. 5A and 5B. In such cases, the position of the rear end of the sheet cannot be corrected.

The registration displacement control in the present embodiment, in which the side edge of sheet S can be aligned with the target value, that is, the reference position even in the state in which sheet S is pressed by a plurality of rollers upstream and downstream of registration roller pair 53*a* as described above, is effective particularly in this case. The characteristic registration displacement control in the present embodiment is therefore preferably performed after the front end of sheet S enters the secondary transfer nip formed by backup roller 423B and other components, as illustrated in FIGS. 5A and 5B.

That is, when the front end of sheet S enters the secondary transfer nip, control unit 100 starts displacing registration roller pair 53*a*, that is, moving registration roller pair 53*a* in the width direction of the sheet based on the sensing signal from line sensor 54.

Specifically, the example illustrated in FIG. 9A illustrates a case where the portion of sheet S excluding the front end in the conveyance direction deviates leftward, and the deviation of sheet S (deviation direction) can be sensed as the deviation of the position of the side edge with line sensor 54.

On the other hand, in the case where the timing when sheet S starts deviating is known (can be estimated) in advance based on peculiarities and other factors specific to each apparatus, the timing when registration roller pair 53*a* is displaced (in other words, position of sheet S in the conveyance direction, hereinafter referred to as "displacement point") is preferably specified in advance as one of the preset values. Instead, the timing when the direction of deviation of the position of sheet S is sensed with line sensor 54 may be specified as the preset value and used to determine the start of the displacement.

The preset value in this case is a value for setting the timing of the displacement of registration roller pair 53*a* after sheet S is thrusted into the secondary transfer nip and until sheet S exits out of the registration nip, and a plurality of displacement timings can be set for each sheet S. In the case where a plurality of displacement timings are set for each sheet S, the interval between the timings can be arbitrarily set.

In the present embodiment, in which the preset value is configured as described above, the start timing of the displacement of registration roller pair 53*a* with respect to single sheet S and the number of displacement actions performed on single sheet S (number of displacement points) can be freely set Further, the preset values may include a value representing the movement speed of registration roller pair 53*a*. The movement speed can be specified on a displacement timing (displacement point) basis.

In the present embodiment, the preset values are values for allowing registration roller pair 53*a* to be displaced both rightward and leftward. On the other hand, in the displacement action at each displacement point, control unit 100 displaces registration roller pair 53*a* only in the direction in which the sheet position deviation is corrected. In other words, in the displacement action at each displacement point, control unit 100 determines not to displace registration roller pair 53*a* in the direction opposite the direction in which the sheet position deviation is corrected. That is, in the displacement action at each displacement point, displacement of registration roller pair 53*a* in the direction opposite the direction in which the sheet position deviation is corrected is inhibited.

On the other hand, in a case where the image forming conditions in the execution of a print job vary, for example, the environment around image forming apparatus 1, the type of sheet S to be used, and other factors vary, the timing when the sub scanning obliqueness of sheet S occurs may vary. In this case, a fixed start timing of each of the displacement actions of registration roller pair 53*a* and a fixed time interval between the displacement actions result in the error, that is, the start timing of the displacement could be delayed with respect to the occurrence of the sub scanning obliqueness or the reverse situation could occur. In other words, it is believed that a preferable timing of each of the displacement actions of registration roller pair 53*a* varies in accordance with the image forming conditions.

Control unit 100 may therefore change the timing of each of the displacement actions of registration roller pair 53*a* in accordance with the image forming conditions. For example, control unit 100 corrects the preset values in such a way that the start timing of each of the displacement actions of registration roller pair 53*a* and the inter-displacement interval specified by the preset values are changed. In this case, control unit 100 adds a correction value or a correction coefficient (ratio) to each of the present values or multiplies each of the preset values by a correction value or a correction coefficient (ratio) to change the present value for the registration displacement control using the changed preset values.

The image forming conditions may include a variety of conditions, such as the type of sheet S (length, width, surface glossiness, and basis weight (rigidity), for example), the environment around image forming apparatus 1 (typically temperature/humidity conditions), the coverage (coverage rate), and the printed surface in the double-sided printing (first or second surface). In consideration of the image forming conditions described above, the correction values and the correction coefficients described above are preferably registered in individual tables according to the conditions. In this case, control unit 100 identifies the type of sheet S or any other factor before a print job is executed, reads a correction value or a correction coefficient from a corresponding table, changes the preset value, and performs the registration displacement control using the changed preset value.

Instead, the displacement start timing and the inter-displacement interval may be specified in advance as the preset values according to the image forming conditions. In view of the fact that the image forming conditions are formed of a large number of factors as described above, the preset values may be registered in individual tables according to the conditions. In this case, control unit 100 identifies the type of sheet S and other factors at the time of execution of a print job, reads a preset value from the corresponding table, and performs the registration displacement control.

Figure 10:
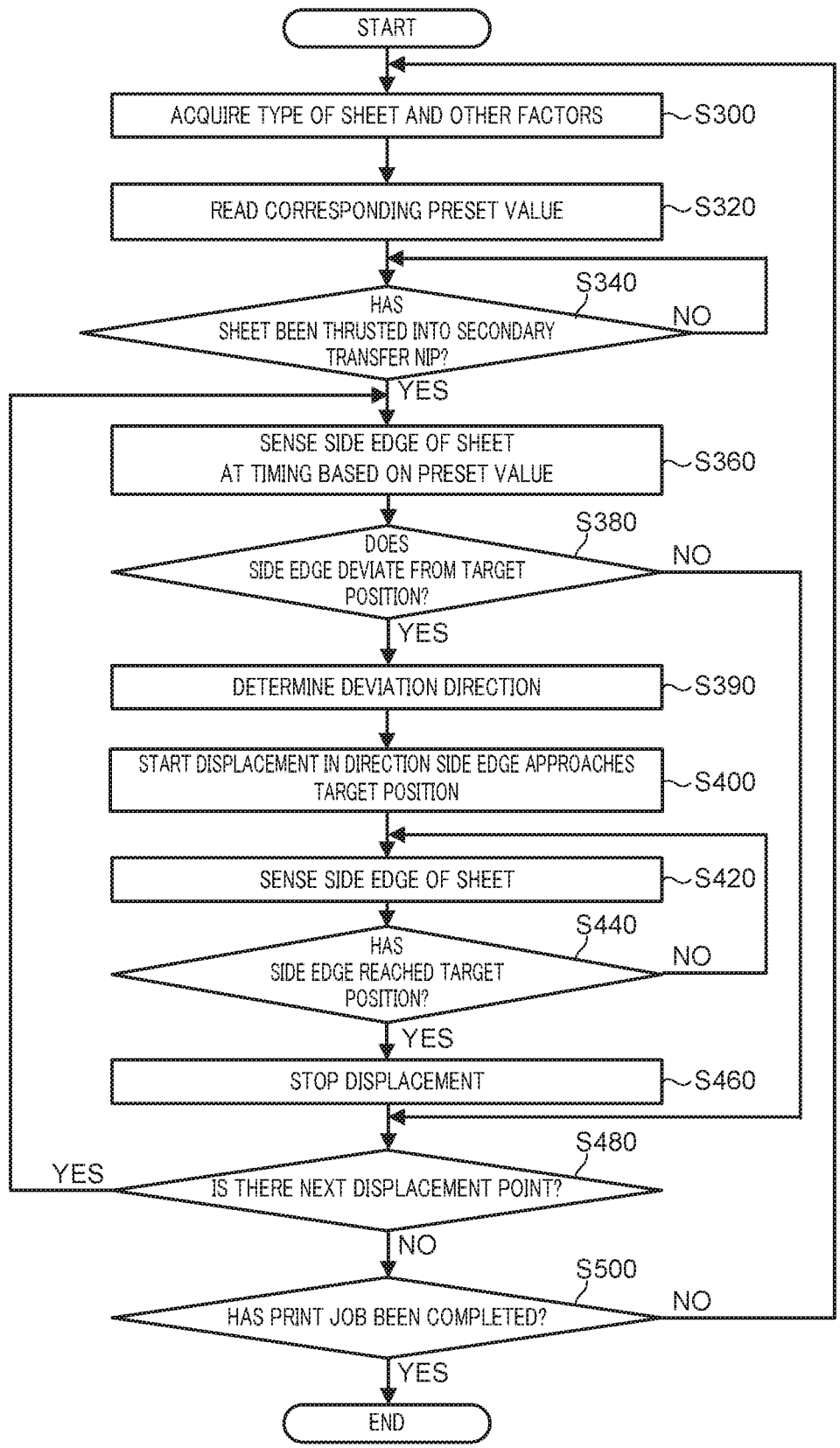
FIG. 10 is a flowchart illustrating an example of conveyance control relating to the registration displacement in the image forming apparatus according to Embodiment 2.

An example of the actions in the displacement control of registration roller pair 53*a* and in turn sheet S in image forming apparatus 1 will be described below with reference to the flowchart of FIG. 10. In the example illustrated in FIG. 10, it is assumed that the displacement of registration roller pair 53*a* is initiated by using the preset values. The flowchart illustrated in FIG. 10 is a flowchart in the case of a long sheet that is sheet S having a size in the conveyance direction greater than 487.7 mm, and the actions illustrated in the flowchart are performed on each sheet S on which an image is formed in the execution of a print job in the case where the aforementioned sheet feeding apparatus dedicated to the long sheet is connected to image forming apparatus 1.

At the execution of the print job, control unit 100 acquires information of the type (such as length, width, glossiness and basis weight (stiffness)) of sheet S to be printed from the user setting information of the print job (step S300).

In step S320, control unit 100 reads the preset value registered in a table corresponding to the acquired image forming condition (type of sheet in this example) and sets the start timing of the displacement of registration roller pair 53*a* at each displacement point.

Control unit 100 subsequently waits until sheet S is thrusted into the secondary transfer nip (NO in step S340) and moves to step S360 once sheet S is thrusted into the secondary transfer nip (YES in step S340).

In step S360, control unit 100 causes line sensor 54 to operate at the timing based on the preset value, for example, a timing immediately before the displacement start timing set in step S320 to sense the side edge of sheet S. In subsequent step S380, control unit 100 evaluates whether or not the position of the side edge of sheet S deviates from the reference position (target position) based on the signal output from line sensor 54. Control unit 100, when it determines that the side edge of sheet S deviates from the reference position (target position) (YES in step S380), determines the direction in which the side edge of sheet S deviated (step S390) and moves to step S400. On the other hand, control unit 100, when it determines that the side edge of sheet S does not deviate from the reference position (target position) (NO in step S380), moves to step S480 but skips the processes in the steps before step S480.

In step S400, control unit 100 starts the displacement of registration roller pair 53*a* (movement of registration roller pair 53*a* toward one side of width direction) in such a way that registration roller pair 53*a* is displaced only in the direction in which the side edge of sheet S approaches the target position. The control described above displaces registration roller pair 53*a* rightward or leftward at the timing based on the preset value relative to sheet S thrusted into the secondary transfer nip, whereby sheet S is displaced in the width direction thereof in response to the displacement of registration roller pair 53*a*.

In this process, the front end of sheet S (long sheet) is sandwiched by the secondary transfer nip and sheet S is conveyed while the toner images are formed, whereas the long sheet is conveyed with the rear end thereof pressed by sheet feed roller 500 in the sheet feeding apparatus in the long sheet optional apparatus (see FIG. 5A).

Control unit 100 subsequently causes line sensor 54 to operate again to start sensing the position of the side edge of sheet S (step S420) and evaluates whether or not the side edge of sheet S has reached the target position (see dotted line in FIGS. 5A and 5B) (Step S440). Control unit 100 then keeps sensing the position until it determines that the side edge of sheet S has reached the target position (NO in step S440 and S420), and when control unit 100 determines that the side edge of sheet S has reached the target position (see FIG. 5B) (YES in step S440), control unit 100 moves to step S460.

In step S460, control unit 100 stops the displacement of registration roller pair 53*a*. The stop control allows the side edge of sheet S to be precisely aligned with the target position (reference position), whereby the sub scanning obliqueness of the sheet is corrected more properly than in related art.

Control unit 100 then evaluates whether or not there is a next displacement point (step S480). In a case where there is a next displacement point (YES in step S480), control unit 100 returns to step S360 and repeats the processes in steps S360 to S460 described above.

Therefore, in the case where a plurality of displacement points are set for each sheet S as described above, the control of the start and stop of the displacement of registration roller pair 53*a* in the direction toward the target position is performed multiple times.

On the other hand, control unit 100, when it determines that there is no next displacement point (NO in step S480), moves to step S500.

In step S500, control unit 100 evaluates whether or not the print job is completed. As a result of the evaluation, in a case where the print job has not been completed (NO in step S500), control unit 100 returns to step S300 and performs the displacement of registration roller pair 53a and the printing, such as image formation, on the following sheet S. On the other hand, in a case where the result of the evaluation shows that the print job has been completed (YES in step 500), control unit 100 terminates the series of processes described above.

As described above in detail, the present embodiment allows correction of the sub scanning obliqueness of sheet S resulting from misalignment, differences in diameter among the rollers, and other factors and hence prevent occurrence of deviation of an image and other problems resulting from the sub scanning obliqueness. Further, the present embodiment, in which the displacement of registration roller pair 53a is stopped based on the result of the sensing of the side edge of sheet S performed by line sensor 54, allows more proper correction of the sub scanning obliqueness of a sheet than in the registration displacement control of related art.

Further, the present embodiment, in which registration roller pair 53a is displaced only in one of the rightward and leftward directions based on the result of the sensing of the deviation direction of the side edge of sheet S while the displacement in both the rightward and leftward directions are allowed, allows the side edge of sheet S to quickly reach the target position irrespective of rightward or leftward deviation of the position of sheet S.

(Embodiment 3)

Embodiment 3 of the image forming apparatus will next be described with reference additionally to FIGS. 11 to 14. The schematic configuration and control system of the image forming apparatus in Embodiment 3 are the same as those in Embodiment 1 (see FIGS. 1 and 2) and will not be described.

In view of the problems described above with reference to FIGS. 3A and 3B and other figures, in Embodiment 3, control unit 100, after starting the displacement action of registration roller pair 53a, that is, movement of sheet S in the width direction thereof, causes line sensor 54 to operate and stops the displacement action based on the result of the sensing performed by line sensor 54 in such a way that the edge of sheet S reaches the target position.

At this point, control unit 100 displaces registration roller pair 53a always toward one side of the width direction (first direction) whenever the displacement action starts. That is, in the present embodiment, after the start of the displacement action of registration roller pair 53a in the first direction along the width direction (rightward or leftward), control unit 100 stops the displacement action in the first direction based on the position of the edge detected with line sensor 54 in such a way that the edge of sheet S reaches the target position.

Therefore, in the present embodiment, an offset unit is provided. The offset unit always moves (that is, offsets) a portion of sheet S in the position of line sensor 54 in the direction (second direction) opposite the direction in which registration roller pair 53a is displaced. The specific configuration of the offset unit will be described later.

Also in Embodiment 3, the displacement of the displacement roller (movement in width direction) is stopped at the timing when the side edge of sheet S coincides with the target position (see dotted line in FIG. 3A), as illustrated in FIG. 4B, as in the embodiments described above. The control described above allows more proper correction of the sub scanning obliqueness of sheet S than in the control of related art, that is, the correction to be made with effective prevention of occurrence of a poor image.

In the case of a long sheet that is sheet S long in the width direction, it is conceivable that sub scanning obliqueness, such as what is called serpentine behavior, occurs depending on the alignment of the rollers and other components, the temperature and humidity, the basis weight (rigidity) of a sheet, and other conditions. In this case, registration roller pair 53a can be displaced multiple times relative to sheet S both rightward and leftward to correct the positional deviation and hence prevent the occurrence of a poor image. On the other hand, in the case where the multiple registration displacement actions relative to single sheet S are performed both rightward and leftward, the stress induced in sheet S increases as compared with the case where sheet S is displaced only rightward or leftward, and the content of the control is relatively complicated.

Figure 11:
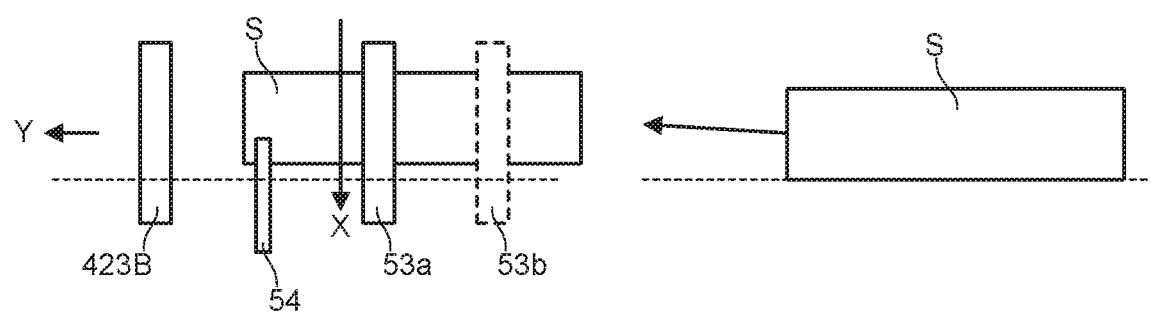
FIG. 11 is a diagram describing an overview of the registration displacement control in an image forming apparatus according to Embodiment 3.

In view of the fact described above, in the present embodiment, registration roller pair 53a is always displaced in one direction (rightward or leftward) in the displacement action to displace sheet S only in one direction (first direction) along the width direction of sheet S. The following description will be made of a case where registration roller pair 53a is always displaced leftward (direction of arrow X in FIG. 11) for ease of description, as illustrated in FIG. 11.

In this case, at the start of each displacement action, control unit 100 always displaces registration roller pair 53a leftward to move the portion of sheet S sandwiched by registration roller pair 53a leftward but does not displace registration roller pair 53a or the portion of sheet S rightward. At the end of the displacement, control unit 100 causes registration roller pair 53a to be separate from sheet S and return to the home position, as in related art.

On the other hand, in each displacement action, to allow the action of displacing registration roller pair 53a leftward and stopping the displacement to effectively function, it is assumed that sheet S deviates in the fixed direction. In other words, sheet S needs to be so conveyed that the position of the side edge thereof always deviates from the target position in the same direction when line sensor 54 detects the position of the side edge of sheet S.

To this end, in the present embodiment, a sheet shift unit or a sheet offset unit (hereinafter simply referred to as "offset unit") is so provided as to give a tendency to the traveling direction of conveyed sheet S in such a way that sheet S always deviates in a fixed direction. In the present embodiment, the offset unit is a mechanism that offsets the portion of sheet S in the position of line sensor 54 in the direction (second direction, rightward in this example) opposite the displacement direction of registration roller pair 53a (leftward). In more detail, the offset unit is a mechanism that moves or conveys sheet S in such a way that the side edge of sheet S in the position of line sensor 54 deviates rightward (in second direction) with respect to the target position (see dotted line in FIG. 11).

A specific configuration example of the offset unit in the present embodiment will be described below. FIG. 11 illustrates an example in which it is assumed that the offset unit is provided upstream of registration roller pair 53a in the conveyance direction and a sheet is so fed into image forming apparatus 1 that the offset unit shifts the left side edge of sheet S rightward in the width direction beyond the target position (reference position) illustrated in FIG. 11. In this case, control unit 100 displaces registration roller pair 53a only in the direction of arrow X (leftward) in FIG. 11 and stops the displacement.

In the aspect in which the offset unit moves (shifts) sheet S, the entire side edge of sheet S may be offset from the target position (reference position), as illustrated in FIG. 11, or sheet S may be tilted, as will be described later.

As an example of the configuration of the offset unit that offsets the entire side edge of sheet S from the target position, a sheet conveying guide (not illustrated) in image forming apparatus 1 is so misaligned as to be shifted in the width direction (rightward) perpendicular to the sheet conveyance direction. In the case where the sheet feeding apparatus that is not illustrated is connected to image forming apparatus 1, the sheet feeding apparatus may be caused to function as the offset unit. For example, the sheet feeding apparatus is so connected to image forming apparatus 1 that the position of a sheet ejection port of the sheet feeding apparatus is shifted in the width direction (rightward) with respect to the sheet conveyance path in image forming apparatus 1.

As an example of the configuration of the offset unit that tilts sheet S, the orientation (parallelism) of the shaft of a roller disposed upstream of registration roller pair 53*a* in the sheet conveyance direction (conveyance rollers including sheet feed roller and loop rollers 53*b*) is so shifted (caused to incline rightward) that the sheet is passed obliquely toward one side (rightward). Instead, rollers upstream of registration roller pair 53*a* may be configured to differ from each other in terms of diameter in the width direction (diameter of left roller in width direction is made greater in this example). In the case where the sheet feeding apparatus that is not illustrated is connected to image forming apparatus 1, the sheet feed roller of the sheet feeding apparatus may be configured as described above, or the entire sheet feeding apparatus (unit) may be so connected to image forming apparatus 1 as to incline with respect to the sheet conveyance path in image forming apparatus 1.

As another example of the configuration of the offset unit that tilts sheet S, registration roller pair 53*a* may be configured as the offset unit. That is, the orientation (parallelism) of the shaft of registration roller pair 53*a* is shifted (caused to incline rightward), or the rollers of registration roller pair 53*a* are configured to differ from each other in terms of diameter in the width direction (diameter of left roller is made greater). Registration roller pair 53*a* thus functions as the offset unit.

As described above, in the sheet conveyance path from the sheet feeding side to registration roller pair 53*a*, the offset unit is formed by misaligning any of the rollers, the sheet conveying guide, or any other member with respect to the usual correct alignment or changing the diameter of any of the variety of rollers in the width direction. The thus configured offset unit allows sheet S to be so conveyed on the side upstream of the secondary transfer nip that the side edge of sheet S deviates toward one side (rightward) from the target position.

As described above, in the case where the offset unit is provided in the sheet conveyance path from the sheet feeding side to registration roller pair 53*a*, control unit 100 displaces registration roller pair 53*a* only in the direction of arrow X (leftward) in FIG. 11 before the front edge of sheet S reaches the secondary transfer nip.

The aforementioned configuration examples have been described with reference to the case where the offset unit is provided upstream of the secondary transfer nip as the configuration applicable to both a long sheet and a non-long sheet. On the other hand, as a configuration example suitable primarily for a long sheet, the members that form the secondary transfer nip may be configured as the offset unit, or the offset unit may be provided downstream of the secondary transfer nip.

Figure 12A:
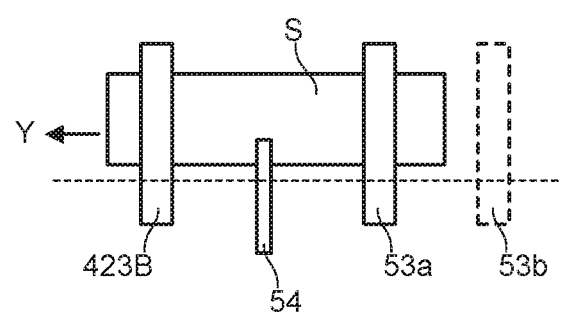
FIGS. 12A and 12B are diagrams describing a configuration example in which an offset unit is provided in a transfer section in Embodiment 3, FIG. 12A illustrating a usual case and FIG. 12B illustrating a case where the offset unit is configured by causing the shafts of members that form a secondary transfer nip to incline.
Figure 12B:
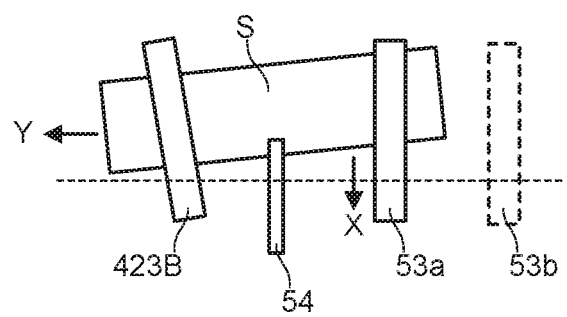

The configuration in which the offset unit is provided in the secondary transfer nip will be described with reference to FIGS. 12A and 12B. FIG. 12A illustrates the usual state in which no offset unit is provided, and FIG. 12B illustrates the case where the members that form the secondary transfer nip are so misaligned as to also function as the offset unit FIG. 12B exaggeratedly illustrates an example in which the shaft of backup roller 423B is caused to incline leftward as the misalignment so that sheet S is passed obliquely leftward. In this case, the shaft of secondary transfer roller 424, which faces backup roller 423B via intermediate transfer belt 421, is also so caused to incline in the same direction as to maintain the secondary transfer nip. In the example illustrated in FIG. 12B, in which sheet S is so conveyed as to be passed obliquely leftward (tilted leftward) by the secondary transfer nip, the side edge of sheet S deviates rightward beyond the target position in the position of line sensor 54. Control unit 100 therefore displaces registration roller pair 53*a* leftward at the start of the displacement.

As another configuration example, backup roller 423B and secondary transfer roller 424 may be configured to differ from each other in terms of diameter in the width direction.

In the configuration example illustrated in FIG. 12B, sheet S starts being passed obliquely leftward after the front end of sheet S enters the secondary transfer nip, and the side edge of sheet S deviated rightward in the position of line sensor 54. Control unit 100 therefore displaces registration roller pair 53*a* only leftward (in direction of arrow X in FIG. 12B) after the front end of sheet S enters the secondary transfer nip.

Figure 13A:
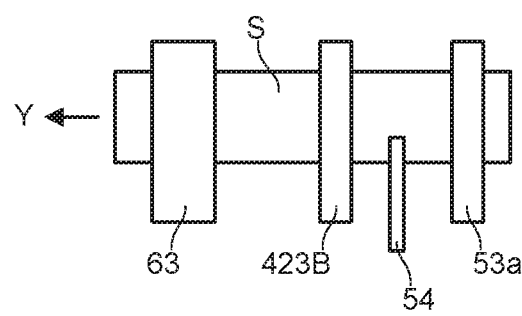
FIGS. 13A and 13B are diagrams describing a case where the offset unit is provided in a fixing unit in Embodiment 3, FIG. 13A illustrating a usual case and FIG. 13B illustrating a case where the offset unit is configured by causing the shafts of members that form a fixing nip to incline.
Figure 13B:
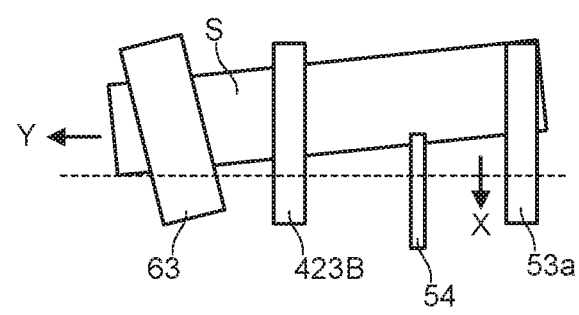

The configuration in which the offset unit is provided in the fixing unit 60 will be described with reference to FIGS. 13A and 13B. FIG. 13A illustrates the usual state in which no offset unit is provided, and FIG. 13B illustrates a case where the members that form the fixing nip are so misaligned as to also function as the offset unit FIG. 13B exaggeratedly illustrates an example in which the shaft of upper pressurizing roller 63 is caused to incline leftward as the misalignment so that sheet S is passed obliquely leftward. In this case, the shaft of lower pressurizing roller 65, which faces upper pressurizing roller 63 via fixing belt 61, is also so caused to incline in the same direction as to maintain the fixing nip. In the example illustrated in FIG. 13B, in which sheet S is so conveyed as to be passed obliquely leftward by the fixing nip, the side edge of sheet S deviates rightward in the position of line sensor 54. Control unit 100 therefore displaces registration roller pair 53*a* leftward at the start of the displacement.

As another configuration example, upper pressurizing roller 63 and lower pressurizing roller 65 may be configured to differ from each other in terms of diameter in the width direction.

In the configuration example illustrated in FIG. 13B, since sheet S starts being passed obliquely leftward after the front end of sheet S enters the fixing nip, control unit 100 displaces registration roller pair 53*a* only leftward (in direction of arrow X in FIG. 13B) after the front end of sheet S enters the fixing nip.

As described above, providing the offset unit, which moves or conveys sheet S in such a way that the side edge of sheet S intentionally deviates from the target position, allows registration roller pair 53*a* to always start being displaced in one direction at the time of registration displacement. According to the present embodiment, in which registration roller pair 53*a* is always displaced only in one direction, the stress induced in sheet S can be reduced, as compared with the case where registration roller pair 53*a* is displaced toward both the sides of the width direction.

The registration displacement control in the present embodiment will be more specifically described below.

In the present embodiment, control unit 100 starts displacing registration roller pair 53a, that is, moving registration roller pair 53a in the width direction when the front end of sheet S passes by a pre-specified position (predetermined position) and enters the secondary transfer nip. The predetermined position varies in accordance with the position of the offset unit in the sheet conveyance path, as described above. Further, the action of starting the displacement may be performed based on the sensing signal from line sensor 54 (see FIG. 4A) or a preset value (fixed value) that will be described later.

In the present embodiment, at the start of the displacement, the amount of movement of registration roller pair 53a does not need to be calculated (see FIG. 4A), and the displacement direction is specified in advance. Therefore, in the present embodiment, even in the case where the displacement starts based on the sensing signal from line sensor 54, the time lag from the sensing performed by line sensor 54 to the start of the movement of the displacement rollers can be reduced.

On the other hand, in the present embodiment in which the offset unit is provided, the deviation direction of sheet S is known in advance. The timing when registration roller pair 53a is displaced (in other word, position of sheet S in conveyance direction, hereinafter referred to as "displacement point") can therefore be specified in advance as the preset value. Therefore, the start timing of the registration displacement for correction of the sub scanning obliqueness does not basically need to rely on the result of the sensing performed by line sensor 54, and the registration displacement control may be performed based on the preset value that specifies the displacement start timing in advance.

In the configuration described below, control unit 100, when it starts the displacement of registration roller pair 53a, does not use a value sensed with line sensor 54 but uses the preset value that specifies the timing of the displacement of registration roller pair 53a to perform registration displacement control. That is, control unit 100 uses the preset value described above to control registration roller pair 53a in such a way that sheet S is displaced in the first direction (leftward).

The preset value is a value for setting the timing of the displacement of registration roller pair 53a after the front end of sheet S is thrusted into registration roller pair 53a (hereinafter also referred to as registration nip) and until the rear end of sheet S exits out of the registration nip. That is, the preset value is a specified value representing the timing when registration roller pair 53a moves in the sheet width direction (displacement timing) after the start of the thrust of sheet S into the registration nip. In the case where a plurality of displacement timings are set for each sheet S, the interval between the timings can be arbitrarily set.

The displacement timing is a value representing the point of time (movement start time) when registration roller pair 53a starts being displaced leftward, in other words, a value representing the distance over which sheet S has been conveyed by the registration nip (or secondary transfer nip) before registration roller pair 53a starts being displaced. The displacement timing can be referred to as the displacement point for convenience. In this case, for example, a plurality of displacement points (positions in direction Y in FIG. 11) where registration roller pair 53a is displaced after the front end of sheet S is thrusted into the registration nip (or secondary transfer nip) are specified as the preset value for a long sheet. Overall, the preset value is a value that specifies, throughout the entire length of sheet S in the conveyance direction, the timing when or a point on sheet S where registration roller pair 53a starts being displaced leftward.

In the present embodiment, in which the preset value is configured as described above, the start timing of the displacement of registration roller pair 53a with respect to single sheet S and the number of displacement actions performed on single sheet S (number of displacement points) can be freely set. Another preset value may be a value representing the displacement speed of registration roller pair 53a. The displacement speed can be specified on a displacement timing (displacement point) basis.

At the time of execution of a print job, control unit 100 therefore uses the preset value described above to start displacing registration roller pair 53a leftward. In the case where sheet S on which printing is performed is a long sheet, in the state in which sheet S is conveyed and fed at the start of the displacement with the front end thereof sandwiched by the secondary transfer nip and the rear end thereof pressed by the sheet feed roller, the portion of sheet S between the front end and the rear end thereof moves leftward with the portion sandwiched by registration roller pair 53a.

Control unit 100 subsequently turns on line sensor 54, starts sensing the position of the side edge of sheet S, and stops the displacement of registration roller pair 53a based on the result of the sensing. Specifically, control unit 100 monitors the sensing signal from line sensor 54 (see FIG. 4B) and stops the leftward displacement of registration roller pair 53a at the timing when the side edge of sheet S reaches the target position described above. Stopping registration roller pair 53a as described above allows the side edge of sheet S to coincide with the target position set in advance at each displacement point, whereby the sub scanning obliqueness of sheet S can be more properly corrected than in related art.

An example of setting of the start timing of displacement of registration roller pair 53a and the like will be described below.

In the case where the image forming conditions in the execution of a print job vary, for example, the environment around image forming apparatus 1, the type of sheet S to be used, and other factors vary, it is conceivable that the aspect of the deviation of sheet S and the degree of the deviation (the manner the deviation occurs) vary. In this case, a fixed start timing of each of the displacement actions of registration roller pair 53a and a fixed time interval between the displacement actions result in the error, that is, the start timing of the displacement could be delayed with respect to the manner sheet S deviates or the reverse situation could occur.

In general, the longer sheet S in the conveyance direction is, the greater the number of displacement actions of (displacement points on) registration roller pair 53a needs to be. Further, since sheet S having high glossiness and sheet S having low glossiness differ from each other in terms of the degree of slippage of the sheet sandwiched by registration roller pair 53a and conveyed therethrough (the former is more slippery), it may be necessary to change the displacement start timing and the number of displacement actions even when the same-size sheet is conveyed. Further, since the smaller the basis weight (rigidity) of sheet S is, the softer the stiffness of the sheet is and hence the more slippery the sheet is in the conveyance, it may be necessary to change the displacement start timing and the number of displacement actions even when the same-size sheet is conveyed.

As described above, the appropriate start timing of the displacement of registration roller pair 53a varies in accordance with the type of sheet S and other image forming conditions in some cases. In consideration of this, the preset values may be registered in individual tables according to the type of sheet S and other image forming conditions, and control unit 100 may identify the type of sheet S and other factors at the time of execution of a print job, read a preset value from the corresponding table, and perform the registration displacement control.

Figure 14:
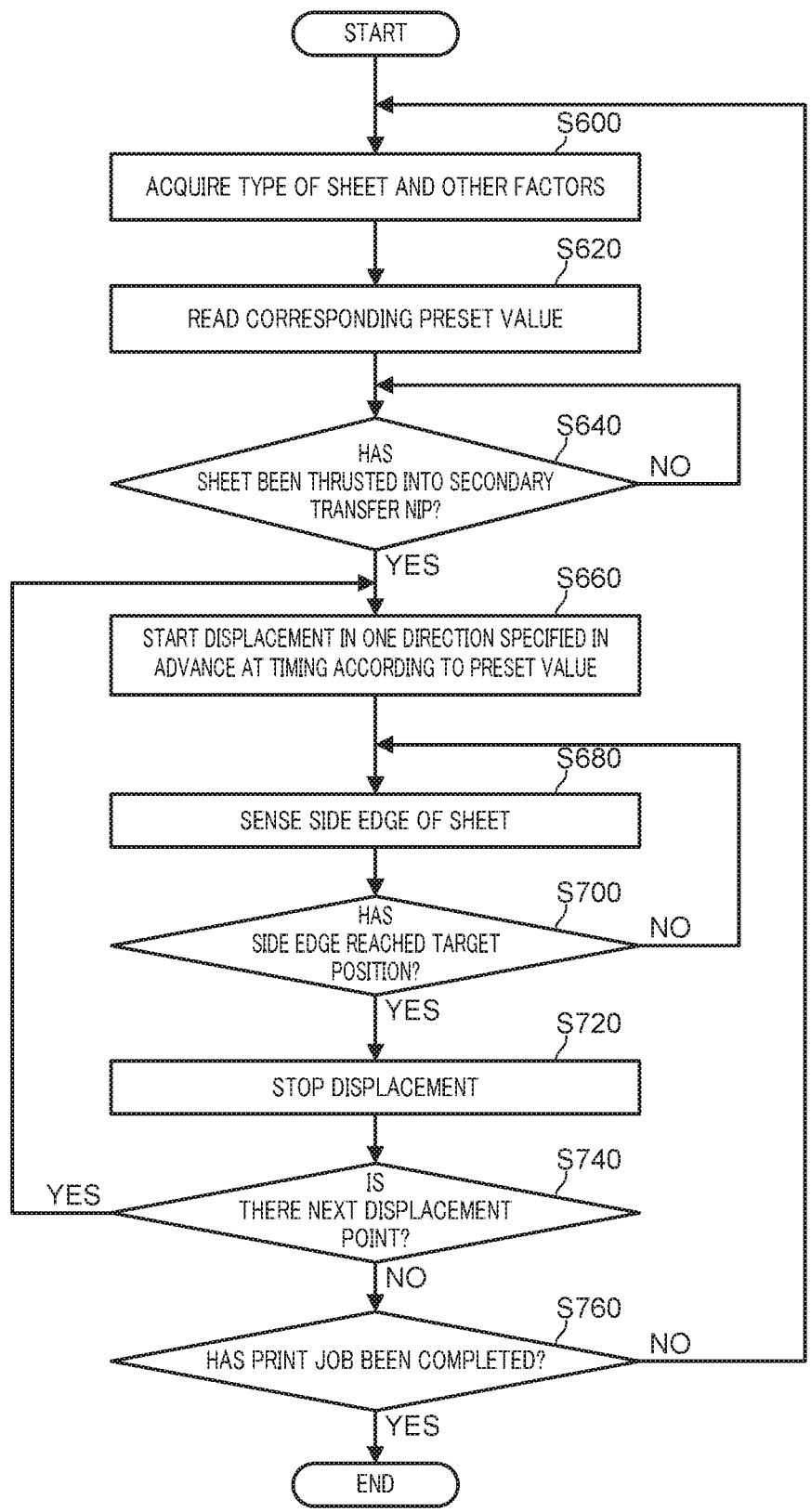
FIG. 14 is a flowchart illustrating an example of conveyance control relating to the registration displacement in the image forming apparatus according to Embodiment 3.

An example of the actions in the displacement control of registration roller pair 53a and in turn sheet S in image forming apparatus 1 will be described below with reference to the flowchart of FIG. 14. In the control example illustrated in FIG. 14, it is assumed that the offset unit is provided in fixing unit 60 (see FIG. 13B) and the displacement of registration roller pair 53a is initiated by using the preset value. The processes illustrated in FIG. 14 are processes in the case of a long sheet that is sheet S having a size that does not allow sheet S to be accommodated in sheet feed tray units 51a to 51c in the apparatus (size greater than 487.7 mm, for example), and the processes are carried out on each sheet S in the case where the sheet feeding apparatus dedicated to the long sheet is connected to image forming apparatus 1.

At the time of the execution of a print job, control unit 100 acquires information on the type of sheet S on which printing is performed (such as length, glossiness, and basis weight (rigidity)) from user set information on the print job (step S600).

In step S620, control unit 100 reads the preset value registered in a table corresponding to the acquired image forming condition (type of sheet in this example) and sets the start timing of the displacement of registration roller pair 53a in each displacement action.

Control unit 100 subsequently waits until sheet S is thrusted into the secondary transfer nip (NO in step S640) and moves to step S660 once sheet S is thrusted into the secondary transfer nip (YES in step S640).

In step S660, control unit 100 starts displacing registration roller pair 53a in one direction specified in advance (leftward in this case) in accordance with the value set in step S620. The displacement start control described above allows registration roller pair 53a to be displaced leftward (in first direction) relative to sheet S thrusted into the secondary transfer nip at the timing according to the present value, and the portion of sheet S sandwiched by registration roller pair 53a is displaced in the width direction (leftward) in response to the displacement of registration roller pair 53a.

Control unit 100 subsequently turns on line sensor 54 to start sensing the position of the side edge of sheet S (step S680) and evaluates whether or not the side edge of sheet S has reached the target position (see dotted line in FIG. 13B) (step S700). Control unit 100 then keeps sensing the position until it determines that the side edge of sheet S has reached the target position (NO in step S700 and S680), and when control unit 100 determines that the side edge of sheet S has reached the target position (see FIG. 4B) (YES in step S700), control unit 100 moves to step S720.

In step S720, control unit 100 stops the displacement of registration roller pair 53a. The stop control allows the side edge of sheet S to be precisely aligned with the target position at the displacement point. As a result, a situation in which the side end of sheet S in the secondary transfer nip, which is located in a position more upstream of registration roller pair 53a, deviates from the reference position (see dotted line in FIG. 12B) can be effectively avoided.

Control unit 100 then evaluates whether or not there is a next displacement point (step S740). In a case where there is a next displacement point (YES in step S740), control unit 100 returns to step S660 and repeats the processes in steps S660 to S720 described above. On the other hand, in a case where there is no next displacement point (NO in step S740), control unit 100 moves to step S760.

In step S760, control unit 100 evaluates whether or not the print job is completed. As a result of the evaluation, in a case where the print job has not been completed (NO in step S760), control unit 100 returns to step S600 and performs the displacement of registration roller pair 53a and the printing, such as image formation, on the following sheet S. On the other hand, in a case where the result of the evaluation shows that the print job has been completed (YES in step S760), control unit 100 terminates the series of processes described above.

As described above, the present embodiment allows correction of the sub scanning obliqueness of sheet S and hence prevent occurrence of deviation of an image and other problems resulting from the sub scanning obliqueness. Further, the present embodiment, in which the displacement of registration roller pair 53a is stopped based on the result of the sensing of the side edge of sheet S performed by line sensor 54, allows more proper correction of the sub scanning obliqueness of a sheet than in the registration displacement control of related art.

Further, according to the present embodiment, in which registration roller pair 53a is displaced only in the first direction in each displacement action, the stress induced in sheet S can be reduced.

The control example described with reference to FIG. 14 and other figures have been described with reference to the case where the preset value is used to start the displacement of registration roller pair 53a in one direction. On the other hand, the present embodiment is also applicable to the displacement action method described above with reference to FIGS. 3A and 3B, that is, the control method in which deviation of the side edge of sheet S is sensed with line sensor 54, the amount of displacement of registration roller pair 53a is calculated from the result of the sensing, and registration roller pair 53a is displaced by the calculated amount in one direction.

The aforementioned embodiments have been described with reference to the image forming apparatus including the transfer section that secondarily transfers an image to be printed onto a sheet by using the intermediate transfer belt. On the other hand, the embodiments described above are also applicable in the same manner to an image forming apparatus based on a transfer method for primarily transferring an image to be printed onto a sheet (monochromatic printer, for example).

The aforementioned embodiments have been described with reference to the case where the sheet conveying member provided upstream of the secondary transfer nip and displaced by the control unit is the registration roller pair. As another example, the sheet conveying member can, for example, be a roller other than the registration roller pair or the sheet conveying guide in addition to or in place of the registration roller pair.

The aforementioned embodiments have been described with reference to the case where a piece of paper is used as the sheet. On the other hand, the aforementioned embodiments are applicable to a rolled sheet in the same manner.

(Embodiment 4)

Embodiment 4 of the image forming apparatus will next be described with reference to FIGS. 15 to 22.

In recent years, a multifunctional image forming apparatus that also serves as a printer, a scanner, a copier, a facsimile machine, and other apparatus is widely used. In the image forming apparatus, in which a sheet is conveyed from the sheet feeding unit and the inverting path to the transfer section at the time of image formation, the sheet is in some cases undesirably offset in the direction perpendicular to the conveyance direction (hereinafter also referred to as sheet width direction in some cases) due, for example, to a mechanical factor in the apparatus. When printing is performed with the sheet being offset as described above, the position where an image is formed on the sheet undesirably deviates from an original proper position.

To precisely align an image with a sheet in consideration of the offset of the sheet, the registration displacement control, in which the sheet is sandwiched between the registration rollers and displaced in the sheet width direction for correction of the offset of the sheet, is performed. For example, PTL 2 describes an image forming apparatus in which registration rollers are disposed upstream of the image forming position, a line sensor is disposed downstream of the registration rollers but upstream of the secondary transfer roller, and the sheet is displaced in the sheet width direction based on the amount of offset of the sheet sensed with the line sensor for correction of the offset of the sheet.

In related-art technology representatively used in PTL 2, the registration rollers are displaced before the front end of a sheet reaches the secondary transfer roller for alignment of the side edge of the sheet Only the displacement before the sheet reaches the secondary transfer roller, however, results in occurrence of sub scanning obliqueness, which is obliqueness of the sheet with respect to the conveyance direction (sub-scanning direction), due to misalignment among the registration rollers, the secondary transfer roller, and the fixing roller and the difference in diameter between a roller on the near side and a roller on the far side when the image forming apparatus is viewed from the front. The skew correction, in which the front end of a sheet is caused to come into contact with the registration rollers for correction of tilt of the sheet, corrects tilt of the front end of the sheet but does not correct tilt of the rear end of the sheet, and distortion therefore remains between the front end and the rear end, undesirably resulting in the sub scanning obliqueness (see FIG. 2). In particular, a long sheet, which is likely to be affected by the sub scanning obliqueness, noticeably experiences the sub scanning obliqueness. When printing is performed in the presence of the sub scanning obliqueness, the position where an image is formed on the sheet deviates in the middle of the printing.

In view of the problems described above, Embodiment 4 of the image forming apparatus for suppressing the positional deviation of an image on a sheet due to the sub scanning obliqueness is proposed.

Figure 15:
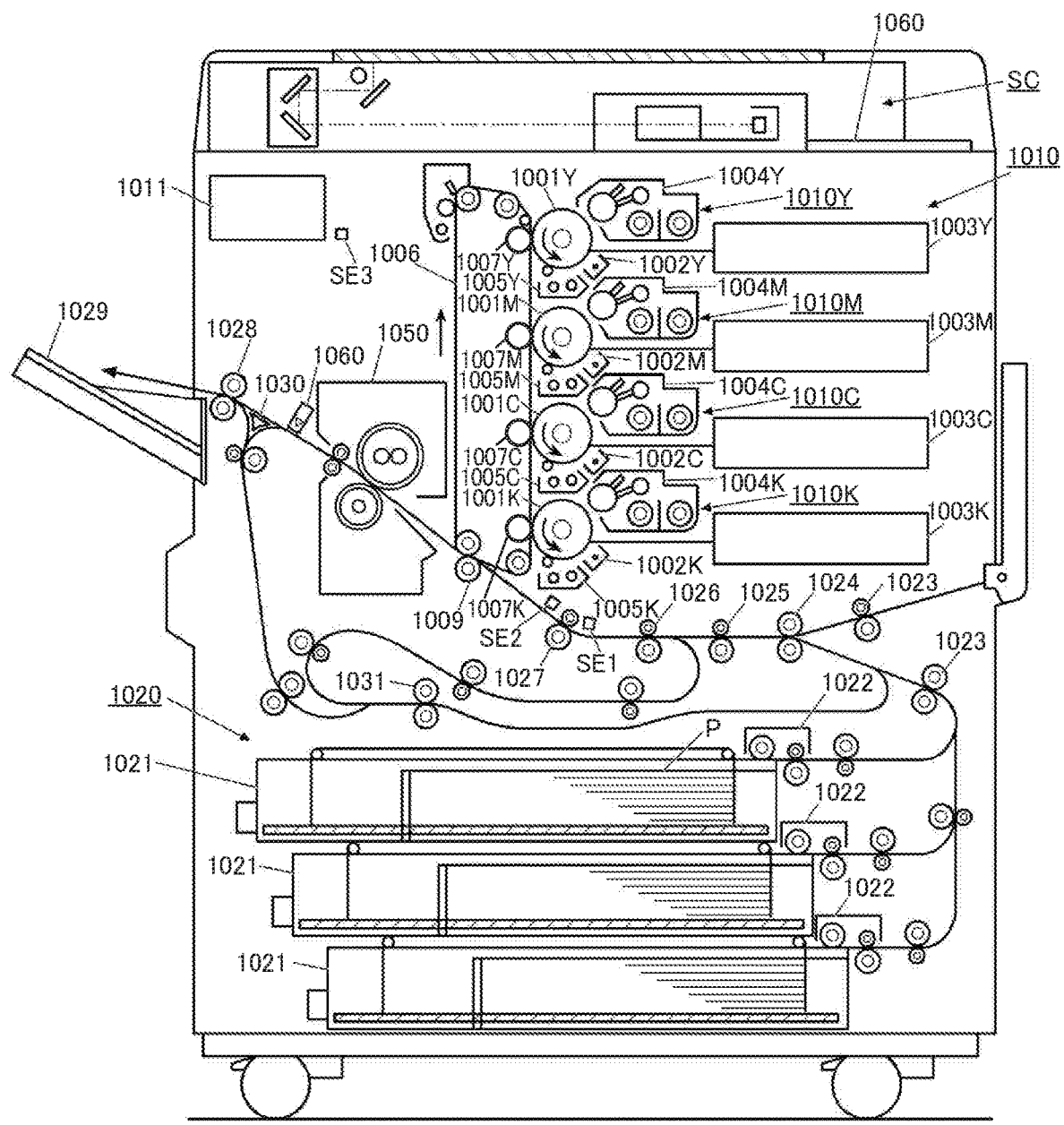
FIG. 15 is a configuration diagram diagrammatically illustrating an image forming apparatus in Embodiment 4.

FIG. 15 is a configuration diagram diagrammatically illustrating image forming apparatus 1000 in Embodiment 4. Image forming apparatus 1000 is, for example, electrophotographic image forming apparatus 1000, for example, a copier, and is what is called a tandem-color image forming apparatus in which a full-color image is formed by a plurality of vertically arranged photoconductors facing a single intermediate transfer belt.

Image forming apparatus 1000 is primarily formed of document reading apparatus SC, image forming unit 1010, fixing unit 1050, image reading unit 1060, and control unit 1011, which are accommodated in a single enclosure.

Document reading apparatus SC scans an image of a document and exposes light thereto by using an optical system of a scanning light exposure apparatus, reads the light reflected off the document with a line image sensor, and produces an image signal based on the read reflected light. The image signal undergoes A/D conversion, shading correction, compression, and other types of processing and is then input as image data to control unit 1011. The image data input to control unit 1011 is not limited to the image data read by document reading apparatus SC and may be image data received from a personal computer or any other image forming apparatus connected to image forming apparatus 1000 via communication unit 1013.

Image forming unit 1010 includes four sets of image forming units (image writing units) 1010Y, 1010M, 1010C, and 1010K, intermediate transfer belt 1006, secondary transfer roller 1009, and other components. Image forming units 1010Y, 1010M, 1010C, and 1010K are formed of image forming unit 1010Y, which forms a yellow (Y) image, image forming unit 1010M, which forms a magenta (M) image, image forming unit 1010C, which forms a cyan (C) image, and image forming unit 1010K, which forms a black (K) image.

Image forming unit 1010Y is formed of photoconductor drum 1001Y and charging unit 1002Y, light writing unit 1003Y, developing apparatus 1004Y, and drum cleaner 1005Y disposed around photoconductor drum 1001Y. Similarly, image forming units 1010M, 1010C, and 1010K are formed of photoconductor drums 1001M, 1001C, and 1001K and charging units 1002M, 1002C, and 1002K, light writing units 1003M, 1003C, and 1003K, developing apparatus 1004M, 1004C, and 1004K, and drum cleaners 1005M, 1005C, and 1005K disposed around photoconductor drums 1001M, 1001C, and 1001K.

Photoconductor drums (photoconductors) 1001Y to 1001K each have a surface uniformly charged by the charging units 1002Y to 1002K, and scanning light exposure performed by light writing units 1003Y to 1003K form latent images on photoconductor drums 1001Y to 1001K. Further, developing apparatus 1004Y to 1004K perform toner development to visualize the latent images on photoconductor drums 1001Y to 1001K. Toner images having predetermined colors corresponding to yellow, magenta, cyan, and black are therefore formed on photoconductor drums 1001Y to 1001K. The toner images formed on photoconductor drums 1001Y to 1001K are sequentially transferred to predetermined positions on rotating intermediate transfer belt 1006 via primary transfer rollers 1007Y, 1000M, 1007C, and 1007K.

The color toner images transferred onto intermediate transfer belt 1006 are transferred by secondary transfer roller 1009 onto sheet S conveyed at a predetermine timing by sheet conveying unit 1020, which will be described later. Secondary transfer roller 1009 is a pressure contact unit that is in contact with intermediate transfer belt 1006 under pressure, and secondary transfer roller 1009 and intermediate transfer belt 1006 form a nip unit (hereinafter referred to as "transfer nip unit").

Sheet conveying unit 1020 conveys sheet S along the path along which sheet S is conveyed. Sheets S are accommodated in sheet feed trays 1021, and each sheet S accommodated in each of sheet feed trays 1021 is captured by sheet feed unit 1022 and delivered into a conveyance path. Instead, sheets S are accommodated in a sheet feed tray provided in a sheet feeding apparatus (not illustrated) connected to image forming apparatus 1000, and each sheet S in the sheet feeding apparatus is supplied from the sheet feeding apparatus to image forming apparatus 1000 and delivered into the conveyance path.

In the conveyance path, a plurality of conveyance means for conveying sheet S are provided upstream of the transfer nip unit. The transfer means are each formed of a pair of rollers in contact with each other under pressure and convey sheet S when at least one of the rollers is driven and rotated by a drive mechanism primarily formed of an electric motor. The pair of rollers, which form each of the conveyance means, is configured to be capable of switching the inter-roller state between the pressure contact state and a separate state.

In the present embodiment, intermediate conveyance rollers 1023 to 1025, loop rollers 1026, and registration rollers 1027 are provided as the conveyance means over the range from the upstream side of the path along which sheet S is conveyed to the downstream side thereof. The conveyance means are not necessarily formed of a pair of rollers and may instead be formed of the combination of belts, the combination of a belt and a roller, or any of a wide variety of other configurations each formed of a pair of rotating members.

In the thus configured conveyance path, sheet S fed from any of the sheet feed trays 1021 or the sheet feed tray of the sheet feeding apparatus is conveyed sequentially by the plurality of intermediate conveyance rollers 1023 to 1025 and loop rollers 1026, which are provided over the range from the upstream side of the conveyance path to the downstream side thereof and travels along the conveyance path. When the front end of sheet S approaches registration rollers 1027, sheet S conveyed by intermediate conveyance rollers 1023 to 1025 and loop rollers 1026 is caused to come into contact with registration rollers 1027 that is not rotating, and loop rollers 1026 keep rotating for a predetermined period to loop sheet S. The formation of the loop corrects obliqueness of the front end of sheet S (skew correction).

Thereafter, when registration rollers 1027 start rotating at a predetermined timing in synchronization with the toner images carried by intermediate transfer belt 1006, the state of intermediate conveyance rollers 1023 to 1025 and loop rollers 1026 is switched from the pressure contact state to the separate state. That is, after the loop rollers 1026 transition to the separate state, sheet S is conveyed only by registration rollers 1027. Registration rollers 1027, which serve as the displacing unit (displacement rollers), perform displacement, which will be described later, while conveying sheet S and conveys sheet S to the transfer nip unit formed of intermediate transfer belt 1006 as the transfer belt and secondary transfer roller 1009 as the transfer section.

Figure 16:
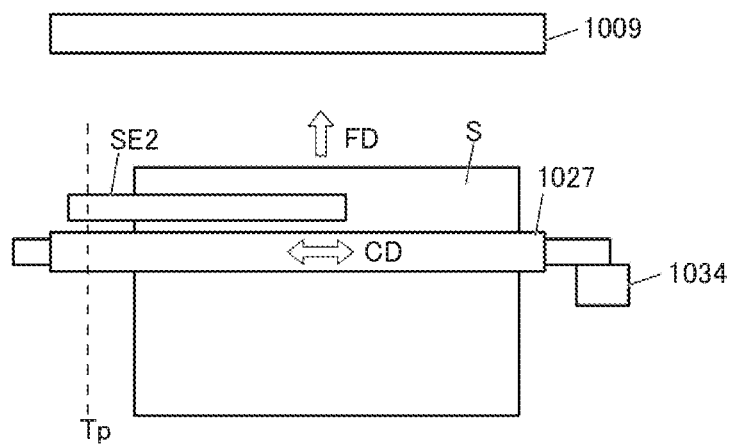
FIG. 16 is a descriptive diagram illustrating the process of displacing a sheet carried out by registration rollers.

FIG. 16 is a descriptive diagram illustrating the displacement of sheet S performed by registration rollers 1027. Registration rollers 1027 are configured to be displaceable in the sheet width direction CD (direction perpendicular to sheet conveyance direction (sub-scanning direction) FD). Drive mechanism 1034 primarily formed of an electric motor is linked to registration rollers 1027. When driven by mechanism 1034, registration rollers 1027 can move in sheet width direction CD from a predetermined home position as a start point.

Registration rollers 1027 can move sheet S being conveyed along sheet width direction CD by moving sheet S along sheet width direction CD in accordance with the passage period for which sheet S passes through registration rollers 1027 (displacement process). Registration milers 1027 thus adjust the conveyance position of sheet S in sheet width direction CD in such a way that sheet S is aligned with the position of the toner images to be transferred. The position where the side edge of sheet S should pass through in sheet width direction CD is called displacement aim position Tp. Displacement aim position Tp is a position where the positional relationship between sheet S and the toner images in sheet width direction CD is optimized (for example, center of sheet S in width direction thereof coincides with center of tonner images in width direction) when the side edge of sheet S passes through the displacement aim position Tp, and registration rollers 1027 adjust the conveyance position of sheet S in sheet width direction CD in such a way that the side edge of sheet S coincides with displacement aim position Tp.

The conveyance path is provided with registration sensor SE1 and position sensing sensor SE2, and control unit 1011 controls the action of registration rollers 1027 based on the results of the detection performed by the sensors.

Registration sensor SE1 is disposed between registration rollers 1027 and loop rollers 1026 in the conveyance path and detects that the front end of sheet S has reached the position where the sensor performs the detection (position upstream of registration rollers 1027 by predetermined distance). The result of the detection performed by registration sensor SE1 is used, for example, to sense the start timing of the rotation of registration rollers 1027.

Position sensing sensor SE2 is a sensing unit that senses the position of the side edge of sheet S in sheet width direction CD. Position sensing sensor SE2 can, for example, be a linear image sensor having a plurality of light receiving elements linearly arranged along sheet width direction CD (CCD line sensor, for example). The result of the detection performed by position sensing sensor SE2 is used to determine the amount of movement of registration rollers 1027 in the displacement process and grasp the timing when the front end of sheet S reaches the transfer nip unit (that is, timing when front end of sheet S is thrusted into secondary transfer roller 1009).

As illustrated in FIG. 15 again, fixing unit 1050 is an apparatus that performs fixing on sheet S on which the toner images have been transferred, that is, sheet S delivered from the transfer nip unit and is formed, for example, of a pair of fixing members (pair of rollers, for example) and a heater that heats one or both of the fixing members. Fixing unit 1050 fixes the toner images onto sheet S in the course of conveyance of sheet S with the aid of pressurization performed by the pair of fixing members and the heat transferred from the fixing members.

Sheet S on which the fixing process has been carried out by fixing unit 1050 is read by image reading unit (ICCU) 1060 and then ejected by sheet ejection rollers 1028 into ejected sheet tray 1029 attached to the outer side surface of the enclosure. In a case where an image is formed also on the rear surface of sheet S, sheet S having undergone image formation on the front surface of the sheet is read by image reading unit 1060 and then conveyed by switching gate 1030 to inverting rollers 1031, which is located below switching gate 1030. Inverting rollers 1031 sandwich the rear end of conveyed sheet S, then convey sheet S in the opposite direction to invert sheet S, and deliver sheet S into a sheet re-feeding conveyance path. Sheet S delivered into the sheet re-feeding conveyance path is conveyed by a plurality of conveyance means for re-feeding a sheet, which return sheet S to the transfer nip unit via registration rollers 1027. Sheet ejection rollers 1028, switching gate 1030, inverting rollers 1031, and the conveyance means for re-feeding a sheet also form sheet conveying unit 1020 described above.

Image reading unit 1060 is formed, for example, of a linear image sensor (CCD line sensor, for example), an optical system, and a light source, reads sheet S on which the toner images have been transferred, and outputs the resultant read image to control unit 1011. In the present embodiment, image reading unit 1060 can measure the colors of the toner images on sheet S but is not limited to a specific apparatus and may be any apparatus at least capable of recognizing the region of sheet S and the region of the toner images. Further, in this example, image reading unit 1060 is disposed downstream of fixing unit 1050 but upstream of the position where switching gate 1030 switches the conveyance path. On the other hand, the position of image reading unit 1060 is not limited to a specific position and may be a position which is downstream of secondary transfer roller 1009 (transfer nip unit) and where both surfaces of sheet S can be read (or one surface of sheet S may be read at a time). Image reading unit 1060 may, of course, instead be disposed as an optional apparatus in a position downstream of image forming apparatus 1000.

Figure 17:
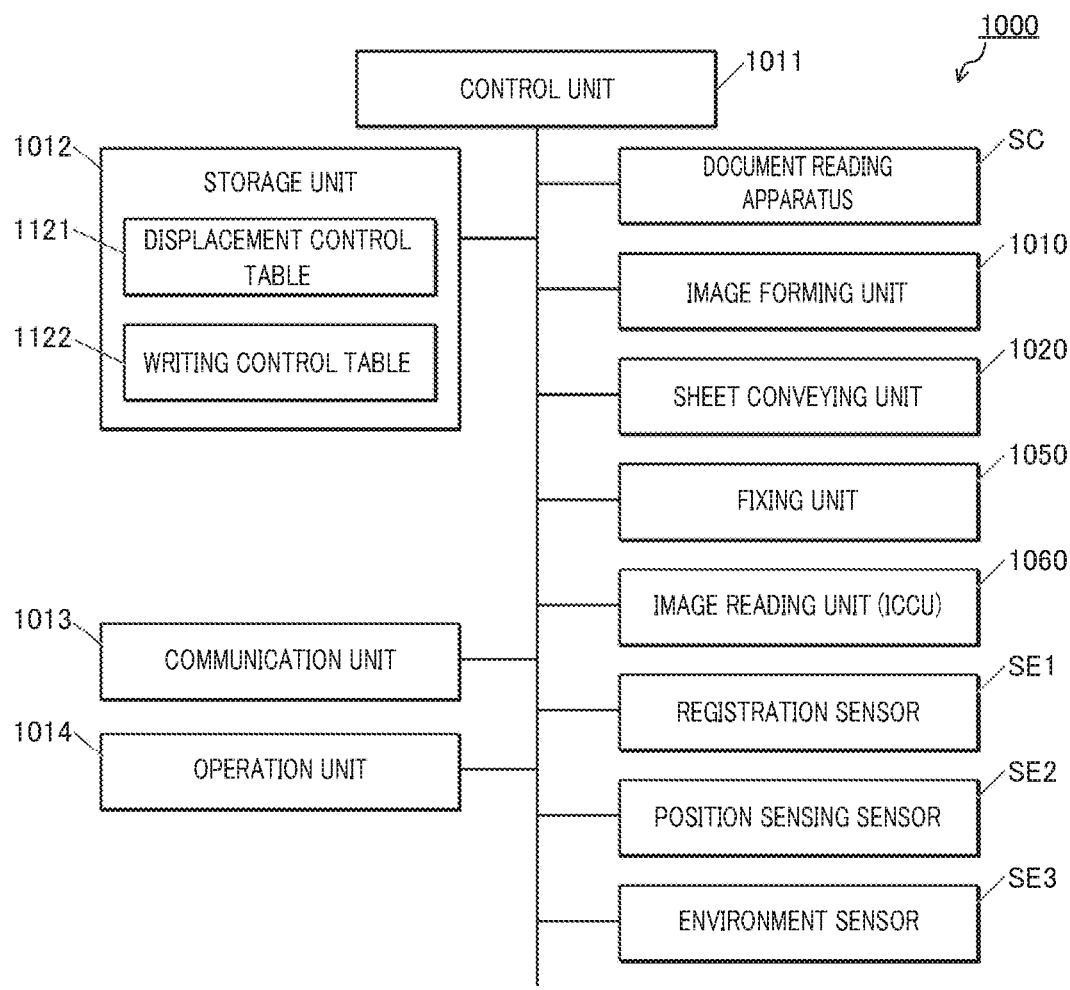
FIG. 17 is a block diagram schematically illustrating the configuration of a control system of the image forming apparatus in FIG. 15.

FIG. 17 is a block diagram schematically illustrating the configuration of a control system of image forming apparatus 1000 according to the present embodiment.

Control unit 1011 is connected to storage unit 1012, communication unit 1013, operation unit 1014, document reading apparatus SC, image forming unit 1010, sheet conveying unit 1020, fixing unit 1050, image reading unit 1060, registration sensor SE1, position sensing sensor SE2, and environment sensor SE3, as illustrated in FIG. 17. Control unit 1011 is formed, for example, of a CPU (central processing unit) and a RAM (random access memory). The CPU in control unit 1011 reads a system program and a variety of processing programs stored in storage unit 1012, develops the read programs in the RAM, and concentrically controls the actions of the portions of image forming apparatus 1000 in accordance with the developed programs.

Storage unit 1012 is formed, for example, of a nonvolatile semiconductor memory and an HDD (hard disk drive) and stores a variety of programs executed by control unit 1011, parameters, data, and other pieces of information necessary for the portions of image forming apparatus 1000.

For example, storage unit 1012 stores displacement control table 1121 (see FIG. 18) and writing control table 1122 (see FIG. 19).

Communication unit 1013 includes an NIC (network interface card), MODEM (modulator-demodulator), an USB (universal serial bus), and a variety of other interfaces and connects image forming apparatus 1000 to an external apparatus.

Operation unit 1014 outputs a variety of pieces of information set by the user to control unit 1011. Operation unit 1014 can be a touch panel that allows the user to input operation in accordance with information displayed on a display. The user can set, via the thus configured operation unit 1014, printing conditions, that is, the type of sheet S (basis weight, size, and quality of paper, for example), a sheet feed tray to be used, the density of an image, the magnification of the image, double-sided printing or not, and other factors. The user can further input a job execution instruction and an action instruction in an adjustment mode via the operation unit 1014. Control unit 1011 can control operation unit 1014 to issue a variety of messages to the user via operation unit 1014.

Environment sensor SE3 includes, for example, a temperature sensor and a humidity sensor, senses the temperature and humidity in the enclosure of image forming apparatus 1000, and outputs the results of the sensing to control unit 1011.

The action of image forming apparatus 1000 in the present embodiment will next be described.

In the present embodiment, control unit 1011 of image forming apparatus 1000 shifts displacement aim position Tp, to which registration rollers 1027 are displaced, and image writing position (wiring center) Wc, where image forming units 1010Y, 1010M, 1010C, and 1010K write images.

[Process of Determining Amounts of Shift of Displacement Aim Position and Image Writing Position]

Image forming apparatus 1000 first carries out the process of determining the amounts of shift of displacement aim position Tp and image writing position Wc. In the present embodiment, image forming apparatus 1000 has an adjustment mode and can determine the amounts of shift of displacement aim position Tp and image writing position Wc in advance (before job is executed) in the adjustment mode.

Specifically, when the user or a service person instructs an action in the adjustment mode via the operation unit 1014, control unit 1011 of image forming apparatus 1000 starts the adjustment mode for determining the amounts of shift of displacement aim position Tp and image writing position Wc. To determine the amounts of shift, it is necessary to consider variation in the position of the side edge of a conveyed sheet. To this end, in the adjustment mode, control unit 1011 causes a predetermined number of sheets (20 sheets, for example) to deliver from any of sheet feed trays 1021 or the sheet feed tray of the sheet feeding apparatus, causes position sensing sensor SE2 to sense the position of the side edge of each of the sheets, and determines the amounts of shift of displacement aim position Tp and image writing position Wc in such a way that these positions are each shifted by an amount greater than the average +σ (3σ, for example) of the results of the sensing.

Determining the amounts of shift in the adjustment mode in such a way that displacement aim position Tp and image writing position Wc are each shifted by an amount greater than the variation in the position of the side edge of a sheet as described above allows adjustment that allows registration rollers 1027 to be always displaced in one direction (same direction).

The location where the position of the side edge of a sheet is measured (that is, location to which displacement aim position Tp and image writing position Wc are shifted) may be one location or a plurality of locations. Further, the location where the position of the side edge of a sheet is measured may be the location at the timing when the registration rollers 1027 are displaced. Whenever a sheet is conveyed, the position of the side edge of the sheet may be measured to acquire a sheet profile.

The variation in the position of the side edge of a sheet varies in accordance with the conditions on the sheet conveyance (predetermined conditions that affect sheet conveyance). It is therefore necessary to change the amounts of shift of displacement aim position Tp and image writing position Wc in accordance with the variation in the position of the side edge of a sheet for each condition on the sheet conveyance. The conditions on the sheet conveyance include the type of sheet (such as basis weight, size, and quality of paper), the environment (temperature and humidity, for example), the sheet surface on which an image is formed (front surface/rear surface), and/or the sheet feed tray. For example, in the case where the type of sheet is thin paper, which is more likely to be passed obliquely than normal paper and thick paper, it is necessary to increase the amount of shift In the present embodiment, tables that memorize the amounts of shift of shift of displacement aim position Tp and image writing position Wc are stored in storage unit 1012 for each of the conditions on the sheet conveyance. FIGS. 18 and 19 illustrate an example of tables that store the amounts of shift of displacement aim position Tp and image writing position Wc on a sheet type basis (displacement control table 1121 and writing control table 1122).

In the present embodiment, registration rollers 1027 are so controlled as to be displaced at a plurality of timings specified in advance (called displacement timings), and displacement control table 1121 and writing control table 1122 store the amounts of shift of displacement aim position Tp and image writing position Wc used at each of the displacement timings (timings 1 to n). To write the toner images precisely in an optimum image position on sheet S, displacement control table 1121 and writing control table 1122 preferably store the amounts of shift of displacement aim position Tp and image writing position Wc used at each of the displacement timings (timings 1 to n) for each type of sheet, for each environment, for each sheet surface on which an image is formed, for each sheet feed tray, and for each of the combinations thereof.

Writing control table 1122 illustrated in FIG. 19 is, by way of example, configured to store the amounts of offset from image writing position Wc (central position in width direction of sheet) automatically determined from displacement aim position Tp, but not necessarily, and may store the amounts of shift of image writing position Wc, as in the format of displacement control table 1121 illustrated in FIG. 18.

Storing displacement control table 1121 and writing control table 1122 in storage unit 1012 as described above allows appropriate determination of the amounts of shift in accordance with each of the conditions.

[Process of Shifting Displacement Aim Position and Image Writing Position]

Image forming apparatus 1000 then carries out the process of shifting displacement aim position Tp and image writing position Wc based on the amounts of shift determined in the process described above. Specifically, control unit 1011 of image forming apparatus 1000 shifts displacement aim position Tp and image writing position Wc based on the amounts of shift so determined that registration rollers 1027 are always displaced toward one side (in same direction). The adjustment can be so made that registration rollers 1027 are always displaced toward one side (in same direction).

Figure 20A:
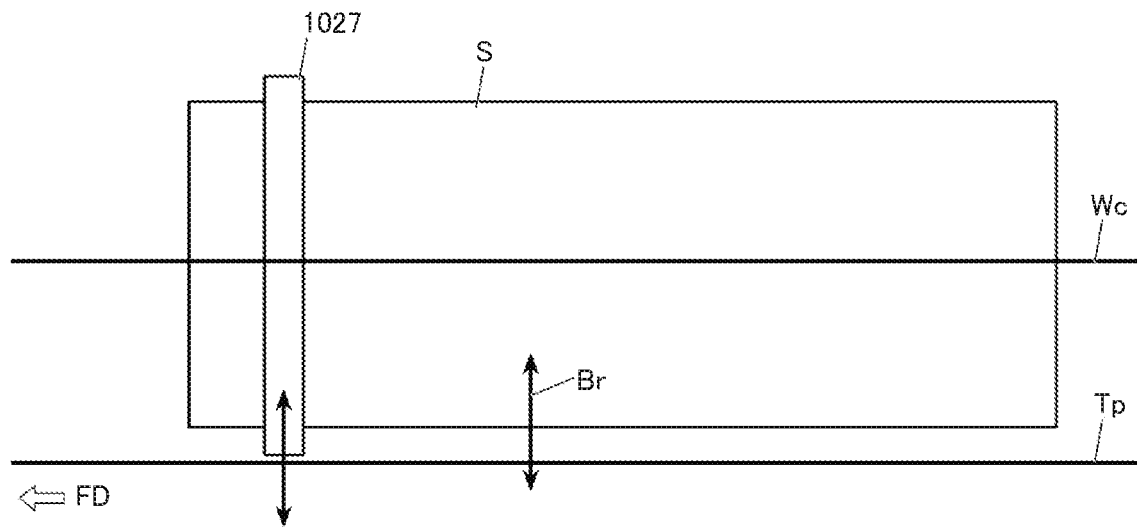
FIGS. 20A and 20B are descriptive diagrams illustrating the relationship between variation in the position of the side edge of a sheet and a displacement aim position.
Figure 20B:
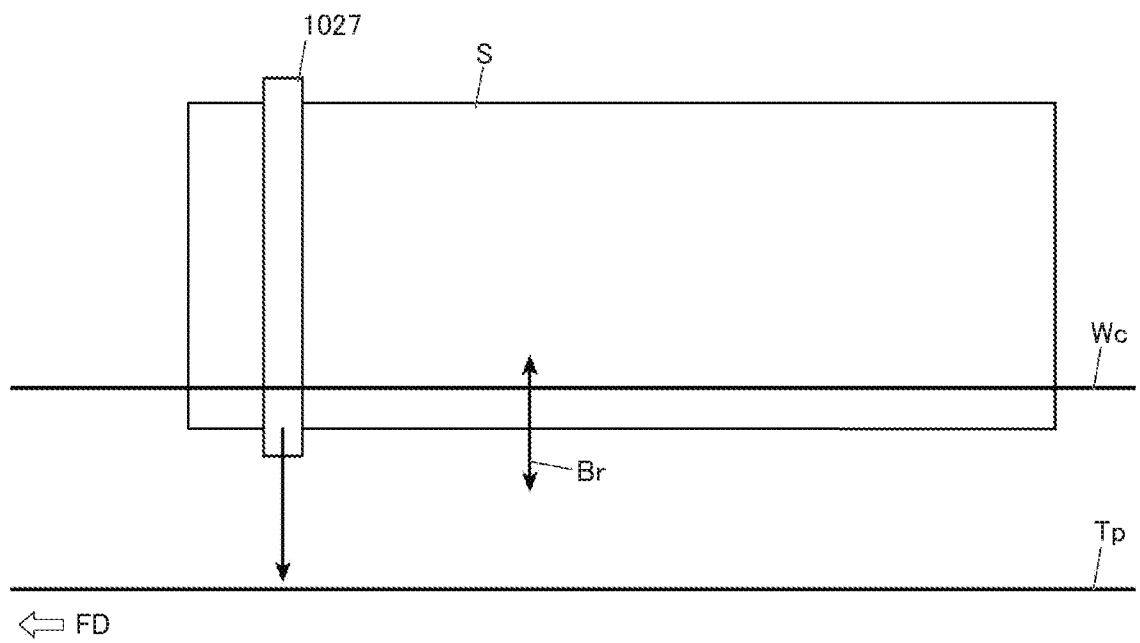

In a technology of related art, variation Br in the position of the side edge of sheet S undesirably causes the position of the side edge of sheet S to overlap with displacement aim position Tp, as illustrated in FIG. 20A. In this case, since registration rollers 1027 are displaced alternately toward the near side (downward in FIG. 20A) and the far side (upward in FIG. 20A), the control of the displacement is undesirably complicated.

On the other hand, in the present embodiment, in which displacement aim position Tp is shifted by an amount greater than variation Br in the sheet edge position (image writing position Wc is shifted in accordance with displacement aim position Tp), registration rollers 1027 can be displaced only in the same direction. The displacement of registration rollers 1027 can therefore be readily controlled.

The distance between displacement aim position Tp and image writing position Wc is typically half the width of a sheet. In this case, the amounts of shift of displacement aim position Tp and image writing position Wc are equal to each other. However, since the distance from registration rollers 1027 to secondary transfer roller 1009 is long, the position of the side edge of a sheet is shifted in some cases in the position of the transfer performed by secondary transfer roller 1009 even after registration rollers 1027 align the sheet with displacement aim position Tp, and the resultant image undesirably deviates. In this case, the amount of shift of image writing position Wc may be corrected in anticipation of the shift in the transfer position. That is, the amounts of shift of displacement aim position Tp and image writing position Wc may be equal to each other or differ from each other.

In the case where the amounts of shift of displacement aim position Tp and image writing position Wc differ from each other, displacement control table 1121 and writing control table 1122 may be separately provided, as illustrated in FIGS. 18 and 19.

[Process of Shifting Displacement Aim Position and Image Writing Position Multiple Times on Same Sheet]

The control described above in which displacement aim position Tp and image writing position Wc are so shifted that registration rollers 1027 are always displaced in the same direction is not necessarily performed in the pattern in which the displacement action is performed on a sheet basis and may be performed in a pattern in which registration rollers 1027 are displaced multiple times on the same sheet. The latter control is performed in consideration of the possibility of displacement both toward the near side and the far side on the same sheet particularly in a case where the sheet is originally passed obliquely or a case where the sheet is passed obliquely in the course of conveyance due, for example, to misalignment of the rollers.

Specifically, control unit 1011 of image forming apparatus 1000 shifts displacement aim position Tp to a position where displacement aim position Tp does not intersect the side edge of the sheet from the front end thereof to the rear end thereof in the conveyance direction (side edge/trajectory/inclination). Image writing position Wc is shifted in accordance with displacement aim position Tp.

Figure 21A:
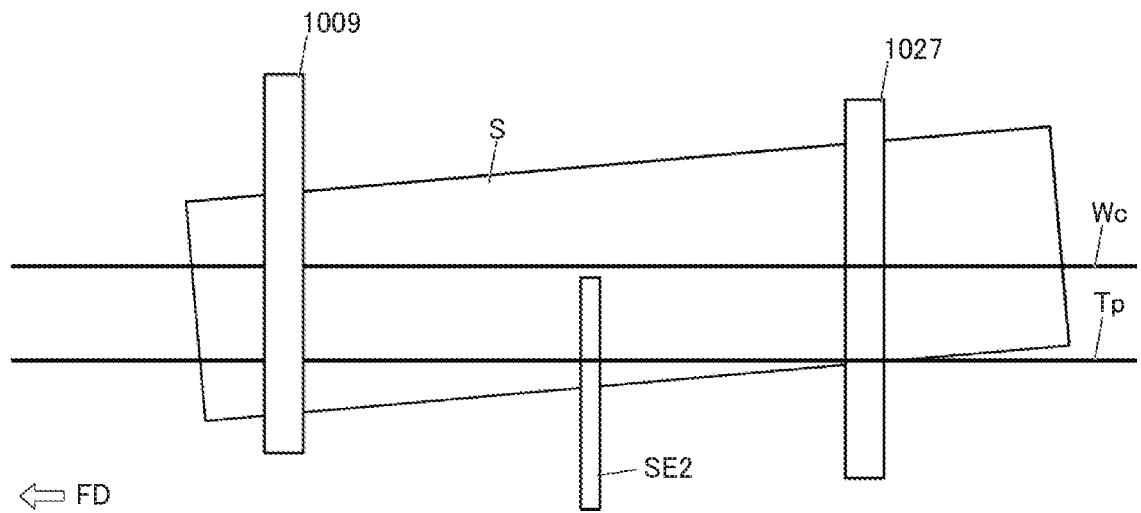
FIGS. 21A and 21B are descriptive diagrams illustrating examples of a case where the trajectory of the side edge of a sheet intersects the displacement aim position.

In the technology of related art, in the case where sheet S is passed obliquely, the trajectory of the side edge of the sheet intersects displacement aim position Tp in some cases, as illustrated in FIG. 21A. In such cases, the same sheet is displaced in both directions toward the near side and the far side, for example, the front end of sheet S is displaced toward the near side and the rear end of sheet S is displaced toward the far side.

Figure 21B:
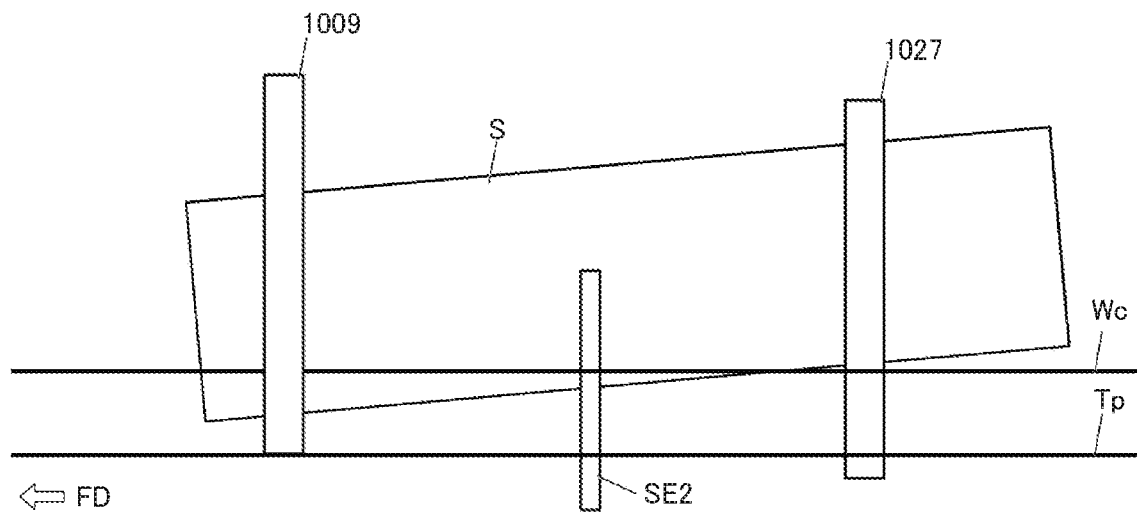
Figure 22:
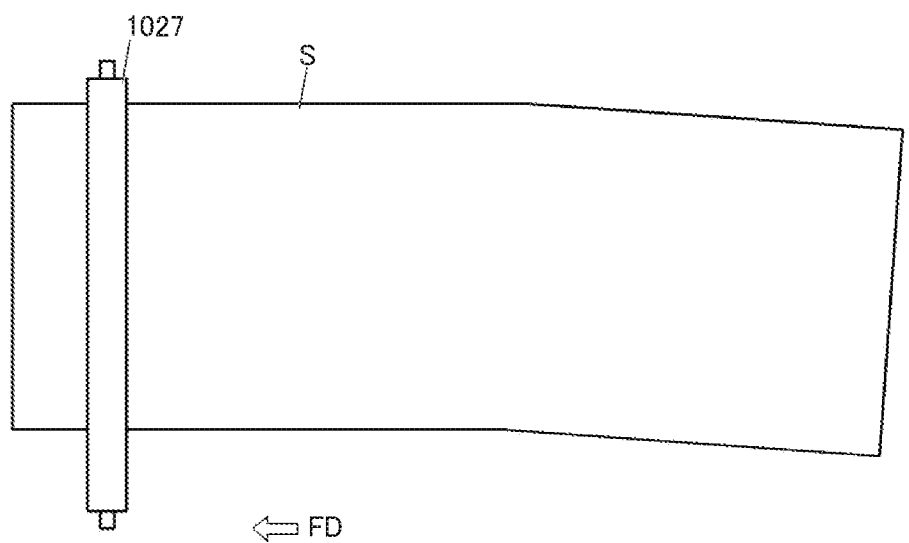
FIG. 22 illustrates an example of sub scanning obliqueness.

On the other hand, in the present embodiment, displacement aim position Tp is shifted to a position where displacement aim position Tp does not intersect the trajectory of sheet S (image writing position Wc is shifted in accordance with displacement aim position Tp), as illustrated in FIG. 21B. That is, registration rollers 1027 are displaced by a greater amount than in the technology of related art. Registration rollers 1027 can therefore always be displaced in the same direction even when the sheet experiences sub scanning obliqueness or variation.

[Timing of Displacement Action]

The displacement action in the present embodiment (action of displacing registration rollers 1027 to move the position of the side edge of a sheet to displacement aim position Tp so shifted that registration rollers 1027 are always displaced in the same direction) may be performed, for example, after the front end of the sheet is thrust into secondary transfer roller 1009 (that is, during sheet conveyance performed by secondary transfer roller 1009). In this case, before the front end of the sheet is thrust into secondary transfer roller 1009, the displacement action of related art (action of displacing registration rollers 1027 to move the position of the side edge of the sheet to displacement aim position Tp before the shift) is performed. The displacement action in the present embodiment may, of course, be performed irrespective of the timing when the front end of the sheet is thrust into secondary transfer roller 1009, that is, performed both before and after the thrust.

[Specific Examples of Displacement Action]

The displacement action in the present embodiment is the action of displacing registration rollers 1027 to move the position of the side edge of a sheet to displacement aim position Tp so shifted that registration rollers 1027 are always displaced in the same direction, as described above.

An example in which the displacement action in the present embodiment is performed is an action of causing position sensing sensor SE2 to sense the distance from the position of the side edge of a sheet to displacement aim position Tp and displacing registration rollers 1027 based on the sensed distance (first displacement action).

Another example in which the displacement action in the present embodiment is performed is an action of starting the displacement of registration rollers 1027 in the width direction of a sheet, then causing position sensing sensor SE2 to sense whether or not the position of the side edge of the sheet has reached shifted displacement aim position Tp, and stopping the displacement of registration rollers 1027 when position sensing sensor SE2 senses that the position of the side edge of the sheet has reached displacement aim position Tp (second displacement action). In the present embodiment, either displacement action may be performed. In the present embodiment, before the front end of the sheet is thrust into secondary transfer roller 1009, the first displacement action may be performed, and after the front end of the sheet is thrust into secondary transfer roller 1009, the second displacement action may be performed.

As described above, image forming apparatus 1000 includes image forming units 1010Y, 1010M, 1010C, and 1010K, which write images, registration rollers 1027, which can displace a conveyed sheet, and control unit 1011, which shifts the positions where image forming units 1010Y, 1010M, 1010C, and 1010K write images. Specifically, image forming apparatus 1000 includes photoconductor drums 1001Y, 1001M, 1001C, and 1001K, on which image forming units 1010Y, 1010M, 1010C, and 1010K write images, and secondary transfer roller 1009, which transfers the images written on photoconductor drums 1001Y, 1001M, 1001C, and 1001K by image forming units 1010Y, 1010M, 1010C, and 1010K onto the sheet. The displacing unit is registration rollers 1027, which are a pair of rollers that convey the conveyed sheet toward secondary transfer roller 1009 and is displaceable in the direction perpendicular to the sheet conveyance direction, and control unit 1011 shifts the positions where image forming units 1010Y, 1010M, 1010C, and 1010K write images in such a way that registration rollers 1027 are always displaced in the same direction.

Therefore, even in a case where deviation in the amount of actual displacement from an instructed value due, for example, to play of an assembled roller and backlash of a gear, variation in sheet position (conveyance), and other factors displace registration rollers 1027 both toward the near side and the far side, variation in the displacement direction of registration rollers 1027 can be suppressed, whereby the displacement of registration rollers 1027 can be stably controlled, and positional deviation of an image with respect to a sheet due to the sub scanning obliqueness can therefore be suppressed.

Further, for example, in the case where registration rollers 1027 are displaced on the same sheet multiple times, and even in the case where control unit 1011 shifts displacement aim position and image writing position in such a way that registration rollers 1027 are always displaced in the same direction to displace registration rollers 1027 multiple times on the same sheet, the displacement of registration rollers 1027 can be stably controlled, and positional deviation of an image with respect to the sheet due to the sub scanning obliqueness can therefore be suppressed.

Specifically, even in a case where control unit 1011 shifts the displacement aim position to a position where the displacement aim position does not intersect the side edge of a sheet from the front end thereof to the rear end thereof in the conveyance direction to displace registration rollers 1027 multiple times on the same sheet, the displacement of registration rollers 1027 can be stably controlled, and positional deviation of an image with respect to the sheet due to the sub scanning obliqueness can therefore be suppressed.

Further, for example, after a sheet is thrust into secondary transfer roller 1009, control unit 1011 displaces registration rollers 1027 to move the position of the side edge of the sheet to the shifted displacement aim position to allow correction of the position of the rear-end-side side edge of the sheet, whereby positional deviation of an image on the rear side of the sheet can be suppressed with high precision.

Further, for example, after registration rollers 1027 start being displaced in the width direction of a sheet, and when position sensing sensor SE2 senses that the position of the side edge of the sheet has reached the shifted displacement aim position, control unit 1011 stops the displacement of registration rollers 1027 to allow the position of the side edge of the sheet to be reliably moved to the displacement aim position in the transfer position, whereby positional deviation of an image with respect to the sheet due to the sub scanning obliqueness can be more reliably suppressed.

Further, for example, providing the adjustment mode, in which a predetermined number of sheets are delivered and the amounts of shift of the displacement aim position and the image writing position are determined based on the position of the side edge of the sheet sensed with position sensing sensor SE2, allows the amounts of shift of the displacement aim position and the image writing position to be set in advance at optimum values before job execution, whereby registration rollers 1027 can be appropriately displaced from the first sheet.

Further, for example, providing storage unit 1012, which stores tables that memorize the amounts of shift of the displacement aim position and the image writing position for each type of sheet, for each environment, for each sheet surface on which an image is formed, for each sheet feed tray, and for each of the combinations thereof, allows the amounts of shift of the displacement aim position and the image writing position to be more appropriate, whereby positional deviation of an image with respect to a sheet due to the sub scanning obliqueness can be more reliably suppressed.

The description of the aforementioned embodiments each show a preferable example of the image forming apparatus according to the present invention, but the present invention is not limited to the description of the embodiments.

For example, in the embodiment described above, displacement aim position Tp and image writing position Wc are shifted, but not necessarily. For example, only image writing position Wc may be shifted as long as the condition that registration rollers 1027 are always displaced in the same direction is satisfied.

Even in the case where only image writing position Wc is shifted as described above, variation in the displacement direction of registration rollers 1027 can be suppressed, whereby the displacement of registration rollers 1027 can be stably controlled, and positional deviation of an image with respect to a sheet due to the sub scanning obliqueness can therefore be suppressed.

Further, in the embodiments described above, the amounts of shift of displacement aim position Tp and image writing position Wc are determined in advance in the adjustment mode, but not necessarily. For example, the position of the side edge of a conveyed sheet (certain sheet) may be sensed with position sensing sensor SE2, and displacement aim position Tp and image writing position Wc for the sheet that is conveyed next (next sheet) may be shifted based on the result of the sensing. In this case, since the amounts of shift can be fed forward to the next sheet and the following sheets, the amount of displacement of registration rollers 1027 can be adjusted in real time, whereby positional deviation of an image with respect to a sheet due to the sub scanning obliqueness can be more reliably suppressed.

The user or a service person may be allowed to arbitrarily rewrite displacement aim position Tp and image writing position Wc.

For example, in the case where tables are so provided that the amounts of shift of displacement aim position Tp and image writing position Wc are related for each type of sheet, as illustrated in FIGS. 18 and 19, the position of the side edge of a sheet and variation therein change in some cases whenever the brand of sheet changes even under the same sheet type condition (coated paper of 120 g/m$^2$, for example).

Therefore, configuring operation unit 1014 as a setting unit to be capable of setting displacement aim position Tp and image writing position Wc and allowing the user or a service person to arbitrarily set displacement aim position Tp and image writing position Wc via operation unit 1014 allows the amount of displacement of registration rollers 1027 to be adjusted as circumstances demand, whereby positional deviation of an image with respect to a sheet due to the sub scanning obliqueness can be more reliably suppressed.

Further, in the embodiments described above, the amounts of shift are determined based on the position of the side edge of a sheet, and displacement aim position Tp and image writing position Wc are shifted by the determined amounts, but not necessarily. For example, the position of the side edge of intermediate transfer belt 1006 may be sensed with a sensor (not illustrated), the amount of deviation of intermediate transfer belt 1006 may be calculated based on the sensed position of the side edge of intermediate transfer belt 1006, and displacement aim position Tp and image writing position Wc may each be shifted by an amount greater than the calculated amount of deviation. That is, even when the position of the side edge of a sheet is correct at the time of transfer performed by intermediate transfer belt 1006, but in a case where intermediate transfer belt 1006 deviates from a correct position, it is conceivable that correct transfer is not performed in image writing position Wc on the sheet. To address the problem described above, shifting displacement aim position Tp and image writing position Wc in consideration of the transfer deviation due to an offset of intermediate transfer belt 1006 allows suppression of positional deviation of an image with respect to the sheet. Also in this case, displacement aim position Tp and image writing position Wc may each be shifted by an amount greater than the amount of deviation of intermediate transfer belt 1006 so that registration rollers 1027 are displaced in the same direction.

Image writing position Wc may be changed in accordance with the amount of shift of intermediate transfer belt 1006. For example, in a case where intermediate transfer belt 1006 is displaced, for example, by steering control, the position of the side edge of intermediate transfer belt 1006 may be sensed with a sensor (not illustrated), and image writing position Wc may be shifted based on the sensed position of the side edge of intermediate transfer belt 1006. Also in this case, displacement aim position Tp and image writing position Wc may each be shifted by an amount greater than the amount of deviation of intermediate transfer belt 1006 so that registration rollers 1027 are displaced in the same direction.

Further, the aforementioned embodiments have been described with reference to the color image forming apparatus in which images formed on the photoconductor drums are primarily transferred to the intermediate transfer roller and the images are transferred from the intermediate transfer roller onto a sheet via the secondary transfer roller, and the present invention is also applicable to a monochrome image forming apparatus that directly transfers an image from a photoconductor drum onto a sheet via a transfer roller.

Further, the aforementioned embodiments have been described with reference to the case where the displacement rollers are registration rollers 1027, but not necessarily. For example, the displacement rollers may instead be rollers different from registration rollers 1027.

Further, the aforementioned embodiments have been described with reference to the configuration in which when registration rollers 1027 are displaced, they are displaced in sheet width direction CD, but not necessarily. That is, registration rollers 1027 may be displaced in a direction other than sheet width direction CD (direction rotated by 5° from sheet width direction CD, for example) as long as conveyed sheet S can be moved along sheet width direction CD.

Further, the aforementioned embodiments have been described with reference to the configuration in which position sensing sensor SE2 is provided between registration rollers 1027 and secondary transfer roller 1009, but not necessarily. For example, position sensing sensor SE2 may be disposed upstream of registration rollers 1027 in the conveyance direction.

Further, the aforementioned embodiments have been described with reference to the configuration in which the positions where image forming units 1010Y, 1010M, 1010C, and 1010K write images are so shifted that registration rollers 1027 are always displaced in the same direction, but not necessarily. That is, the positions where image forming units 1010Y, 1010M, 1010C, and 1010K write images only need to be so shifted that the same displacement direction is always achieved. For example, as the displacing unit of the present embodiment, a configuration in which the position of a sheet is moved by rotating the sheet may be employed in place of registration rollers 1027.

Further, the aforementioned embodiments have been described with reference to an electrographic image forming apparatus, but not necessarily. For example, the present invention is also applicable to an inkjet-type image forming apparatus that discharges ink through a nozzle onto a recording medium and lands the ink in a desired pattern to record an image on the recording medium (for example, inkjet-type recording apparatus that discharges ink that cures when exposed with a predetermined energy line through a nozzle and causes the discharged ink on the recording medium to be irradiated with the predetermined energy line so that the cured ink is fixed on the recording medium).

In the aforementioned description, as a computer readable medium on which a program according to the present invention is recorded, a nonvolatile memory, a hard disk drive, and other components are disclosed, but not necessarily. As another computer readable medium, a portable recording medium, such as a CD-ROM, can be used. Further, as a medium that provides data used in the program according to the present invention over a communication line, a carrier wave is also used.

In addition, the detailed configurations and actions of the image forming apparatus can be changed as appropriate to the extent that the changes do not depart from the substance of the present invention.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:
a transfer section that transfers an image onto a sheet;
a sheet conveying member that is provided upstream of the transfer section in a sheet conveyance direction and conveys the sheet; and
a hardware processor that controls displacement of the sheet conveying member in such a way that the sheet is displaced at least twice along a width direction of the sheet,
wherein the hardware processor performs first displacement control in which the sheet conveying member is displaced in a direction which is specified in advance with respect to the sheet and in which an edge of the sheet in the width direction is directed toward a target position and second displacement control in which the sheet conveying member is displaced in a direction opposite the direction of the first displacement, the first and second displacement controls being performed on a same sheet.

2. The image forming apparatus according to claim 1, wherein after the first displacement and the second displacement start, a detecting unit detects a position of the edge of the sheet in the width direction, and the hardware processor stops the displacement based on the position of the edge detected during the displacement.

3. The image forming apparatus according to claim 1, wherein the hardware processor performs the first displacement control and the second displacement control after a front end of the sheet enters the transfer section.

4. The image forming apparatus according to claim 1, wherein the hardware processor performs the first displacement control and the second displacement control by using preset values that specify timings when the first displacement and the second displacement are performed.

5. The image forming apparatus according to claim 4, wherein amounts of the first displacement and the second displacement are specified as the preset values.

6. The image forming apparatus according to claim 4, wherein the preset values include a value representing a displacement speed in the first displacement or the second displacement.

7. The image forming apparatus according to claim 4, further comprising a table that specifies the preset values in accordance with an image forming condition.

8. The image forming apparatus according to claim 4, wherein the hardware processor changes the timings when the first displacement and the second displacement are performed in accordance with an image forming condition.

9. The image forming apparatus according to claim 1, wherein the hardware processor begins the first displacement control by using at least one preset value without receiving input about a current position of the sheet.

* * * * *